(12) United States Patent
She et al.

(10) Patent No.: US 10,938,707 B2
(45) Date of Patent: Mar. 2, 2021

(54) PEER-TO-PEER OPTIMIZATION IN EXISTING TREE-BASED TOPOLOGY BASED ON GENERATING LOCALLY-OPTIMIZED TREE USING CONFINED ADVERTISEMENTS

(71) Applicant: Cisco Technology, Inc., San Jose, CA (US)

(72) Inventors: Huimin She, Shanghai (CN); Feiliang Wang, Shanghai (CN); Li Zhao, Shanghai (CN); Chuanwei Li, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 53 days.

(21) Appl. No.: 16/274,979

(22) Filed: Feb. 13, 2019

(65) Prior Publication Data

US 2020/0259736 A1    Aug. 13, 2020

(51) Int. Cl.
*H04L 12/733* (2013.01)
*H04L 12/24* (2006.01)
(Continued)

(52) U.S. Cl.
CPC ............ *H04L 45/122* (2013.01); *H04L 12/44* (2013.01); *H04L 41/083* (2013.01); *H04L 45/02* (2013.01);
(Continued)

(58) Field of Classification Search
CPC ....... H04L 12/44; H04L 41/083; H04L 41/12; H04L 67/1042; H04L 67/1061; H04L 45/00; H04L 45/02; H04L 45/04; H04L 45/08; H04L 45/12; H04L 45/14; H04L 45/26; H04L 45/121; H04L 45/122; H04L 45/123; H04L 45/126; H04L 45/127; H04L 12/24; H04L 12/54; H04L 12/56; H04L 12/413; H04L 12/715; H04L 12/721; H04L 12/733; H04L 12/751; H04L 12/753;
(Continued)

(56) References Cited

U.S. PATENT DOCUMENTS 7,366,111 B2    4/2008  Thubert et al.
7,428,221 B2    9/2008  Thubert et al.
(Continued)

OTHER PUBLICATIONS

Thubert et aL, U.S. Appl. No. 16/026,203, filed Jul. 3, 2018.
(Continued)

*Primary Examiner* — Tri H Phan
(74) *Attorney, Agent, or Firm* — Leon R. Turkevich

(57) ABSTRACT

In one embodiment, a method comprises determining, by a network device, a hop-by-hop path in a low-power and lossy network having a tree-based topology originated at a root network device, the hop-by-hop path comprising identified network devices for forwarding a data packet from a source network device to a destination device in the tree-based topology; and causing, by the network device, the destination device to initiate generation of a locally-optimized tree that bypasses the root network device and optimizes forwarding of the data packet from the source network device to the destination device, based on confined advertisements within the tree-based topology relative to the identified network devices.

20 Claims, 18 Drawing Sheets

(51) Int. Cl.
*H04L 12/44* (2006.01)
*H04L 12/751* (2013.01)
*H04L 29/08* (2006.01)
*H04L 12/721* (2013.01)

(52) U.S. Cl.
CPC ........ *H04L 67/1042* (2013.01); *H04L 45/123* (2013.01)

(58) Field of Classification Search
CPC . H04L 12/763; H04L 29/08; H04L 29/08396; H04L 29/08414; H04L 45/20; H04L 45/22; H04L 45/24; H04L 45/34; H04L 45/48; H04L 45/72
See application file for complete search history.

(56) References Cited

U.S. PATENT DOCUMENTS

| | | | | |
|---|---|---|---|---|
| 8,392,541 | B2 * | 3/2013 | Agarwal | H04W 40/32 709/220 |
| 8,630,177 | B2 * | 1/2014 | Vasseur | H04L 45/34 370/229 |
| 9,479,421 | B2 * | 10/2016 | Thubert | H04L 45/48 |
| 9,510,347 | B2 * | 11/2016 | Thubert | H04L 45/121 |
| 10,277,476 | B2 * | 4/2019 | Mermoud | G06N 99/00 |
| 10,320,652 | B2 * | 6/2019 | Thubert | H04L 12/44 |
| 10,389,619 | B2 * | 8/2019 | Wetterwald | H04L 45/20 |
| 10,530,685 | B2 * | 1/2020 | Dong | H04L 45/16 |
| 10,609,621 | B2 * | 3/2020 | Yang | H04L 45/48 |
| 2013/0223218 | A1 | 8/2013 | Vasseur et al. | |
| 2014/0129734 | A1 | 5/2014 | Vasseur et al. | |
| 2016/0018507 | A1 | 1/2016 | Chen et al. | |
| 2016/0072697 | A1 | 3/2016 | Thubert et al. | |
| 2017/0223700 | A1 | 8/2017 | Thubert et al. | |
| 2018/0199339 | A1 | 7/2018 | Thubert et al. | |
| 2018/0254971 | A1 | 9/2018 | Thubert et al. | |

OTHER PUBLICATIONS

Anamalamudi et al., "Asymmetric AODV-P2P-RPL in Low-Power and Lossy Networks (LLNS)", [online], ROLL Internet Draft, Oct. 18, 2018, [retrieved on Jan. 18, 2019]. Retrieved from the Internet: URL: <https://tools.ietf.org/pdf/draft-ietf-roll-aodv-rpl-05.pdf>, pp. 1-25.

Thubert et aL., "Root initiated routing state in RPL", [online], ROLL Internet Draft, Dec. 21, 2018, [retrieved on Jan. 18, 2019]. Retrieved from the Internet: URL: <https://tools.ietf.org/pdf/draft-ietf-roll-dao-projection-05.pdf> pp. 1-22.

Dhumane et al., "A review on routing protocol for low power and lossy networks in IoT", [online], Int'l Journal of Advanced Engineering and Global Technology, vol. 3, Issue 12, Dec. 2015, [retrieved on Jan. 10, 2019]. Retrieved from the Internet: <https://www.researchgate.net/publication/291075126_A_review_on_routing_protocol_for_low_power_and_lossy_networks_in_IoT>, cover sheet and pp. 1440-1444 (6 pages).

Winter, Ed., et al., "RPL: IPv6 Routing Protocol for Low-Power and Lossy Networks", Internet Engineering Task Force (IETF), Request for Comments: 6550, Mar. 2012, pp. 1-157.

Goyal. Ed., et al., "Reactive Discovery of Point-to-Point Routes in Low-Power and Lossy Networks", [online], Internet Engineering Task Force (IETF), Request for Comments: 6997, Aug. 2013, [retrieved on Jan. 18, 2019]. Retrieved from the Internet: URL: <https://tools.ietf.org/pdf/rfc6997.pdf>, pp. 1-40.

* cited by examiner

PEER-TO-PEER OPTIMIZATION IN EXISTING TREE-BASED TOPOLOGY BASED ON GENERATING LOCALLY-OPTIMIZED TREE USING CONFINED ADVERTISEMENTS

TECHNICAL FIELD

The present disclosure generally relates to peer-to-peer (P2P) optimization in an existing tree-based topology based on generating a locally-optimized tree using confined advertisements.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Downward routes (i.e., away from the DAG root) can be created based on Destination Advertisement Object (DAO) messages that are created by a child network device and propagated toward the DAG root. The RPL instance implements downward routes in the DAG of the LLN in either a storing mode only (fully stateful), or a non-storing mode only (fully source routed by the DAG root). In storing mode, a RPL node unicasts its DAO message to its parent node, such that RPL nodes store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

Attempts to implement a bypass of the DAG root for network traffic in the DODAG suffer various deficiencies, for example generation of sub-optimal paths between source and destination devices in the DODAG, and processing burdens on the DAG root that limit the scalability of bypass attempts in a large-scale DODAG that can comprise thousands of RPL nodes.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
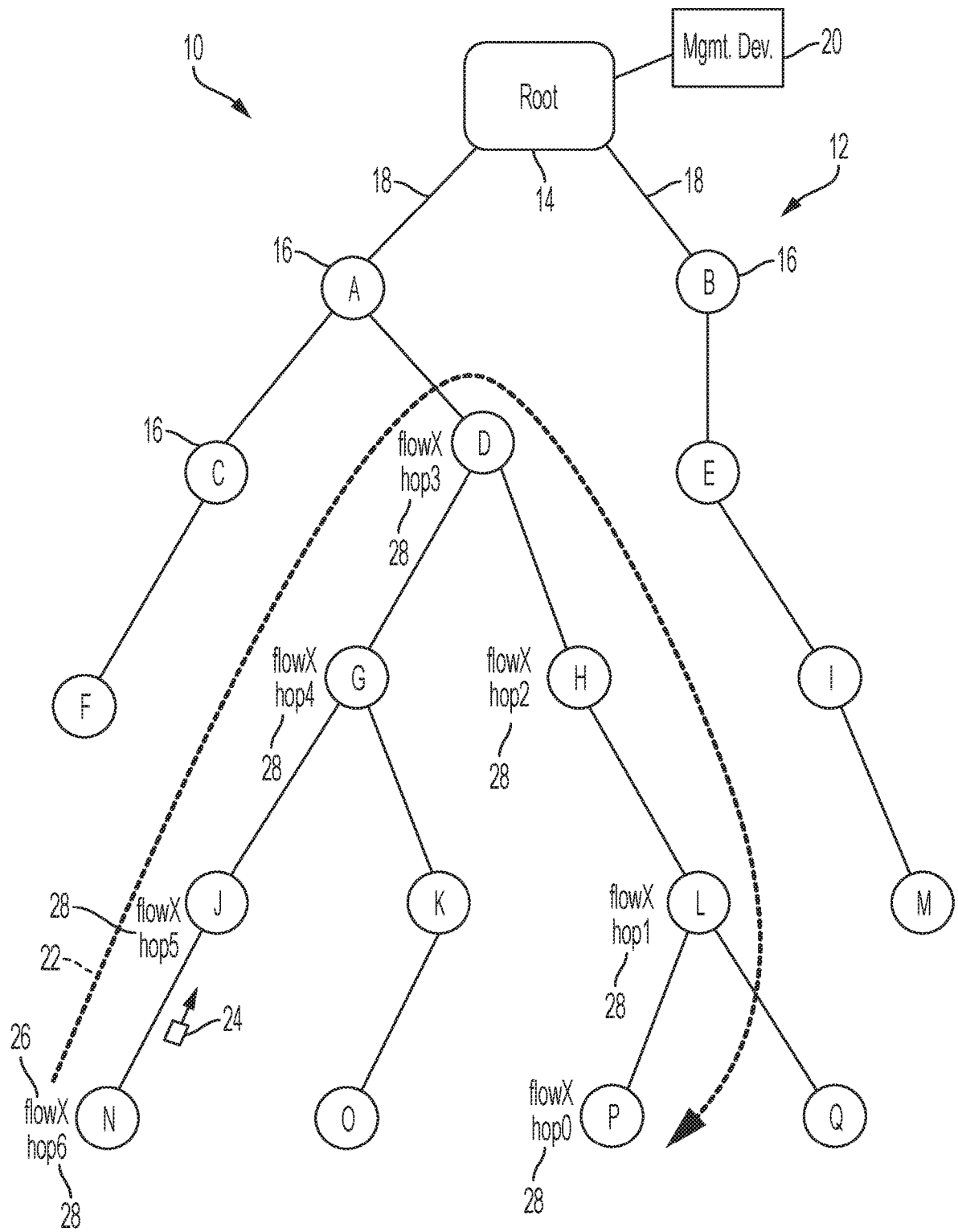
FIGS. 1A-1M illustrate an example system having an apparatus for causing generation of a locally-optimized tree using confined advertisement for peer-to-peer optimization in an existing tree-based topology, according to an example embodiment.

In one embodiment, a method comprises determining, by a network device, a hop-by-hop path in a low-power and lossy network having a tree-based topology originated at a root network device, the hop-by-hop path comprising identified network devices for forwarding a data packet from a source network device to a destination device in the tree-based topology; and causing, by the network device, the destination device to initiate generation of a locally-optimized tree that bypasses the root network device and optimizes forwarding of the data packet from the source network device to the destination device, based on confined advertisements within the tree-based topology relative to the identified network devices.

In another embodiment, an apparatus is implemented as a physical machine. The apparatus comprises non-transitory machine readable media configured for storing executable machine readable code, a device interface circuit, and a processor circuit. The processor circuit is configured for executing the machine readable code, and when executing the machine readable code operable for: determining a hop-by-hop path in a low-power and lossy network having a tree-based topology originated at a root network device, the hop-by-hop path comprising identified network devices for forwarding a data packet from a source network device to a destination device in the tree-based topology, and causing, via the device interface circuit, the destination device to initiate generation of a locally-optimized tree that bypasses the root network device and optimizes forwarding of the data packet from the source network device to the destination device, based on confined advertisements within the tree-based topology relative to the identified network devices.

In another embodiment, one or more non-transitory tangible media encoded with logic for execution by a machine and when executed by the machine operable for: determining, by the machine implemented as a network device, a hop-by-hop path in a low-power and lossy network having a tree-based topology originated at a root network device, the hop-by-hop path comprising identified network devices for forwarding a data packet from a source network device to a destination device in the tree-based topology; and causing, by the network device, the destination device to initiate generation of a locally-optimized tree that bypasses the root network device and optimizes forwarding of the data packet from the source network device to the destination device, based on confined advertisements within the tree-based topology relative to the identified network devices.

DETAILED DESCRIPTION

Particular embodiments enable a scalable deployment of optimized peer-to-peer (P2P) paths in a low-power and lossy network (LLN) having a tree-based topology originated at a root network device, where the tree-based topology (e.g., a DODAG) can comprise thousands of network devices implemented as RPL nodes requiring optimization of P2P communications in the tree-based topology. Example embodiments enable RPL nodes to execute localized optimization of P2P communications that can guarantee prescribed quality of service (QoS) requirements in terms of latency, reliability, etc., without the necessity of a centralized device (such as the root network device, a management device, etc.) calculating or installing an optimized P2P path that bypasses the root network device.

Conventional deployments of the RPL protocol (e.g., according to RFC 6550) can suffer from many inefficiencies in a DAG network topology in LLNs that contain thousands of network devices that are densely deployed in the data network. For example, a smart grid Advanced Metering Infrastructure (AMI) network can utilize a connected grid mesh (CG-Mesh) that comprises a field area router (FAR) and thousands of network devices, where each network device can reach, within its transmission range, hundreds of neighboring network devices.

Attempts to implement a bypass path from a source device to a destination device in an LLN having a tree-based DODAG topology and that bypasses a root network device can encounter numerous disadvantages. One attempt required the root network device to generate the bypass path via a common parent device in the DODAG topology, and install the bypass path within one or more network devices in the DODAG topology: such an attempt is not scalable for large-scale LLNs because a root network device is not capable of generating optimized P2P paths for thousands of network devices. A root network device in a non-storing mode RPL topology stores a specific source-route path for reaching a corresponding RPL node among thousands of RPL nodes in the DODAG topology, and as such the root network device typically cannot identify an optimized P2P path because the root network device is not aware of neighboring RPL nodes that are not connected to a given RPL node but that might provide a "short-cut" path toward another RPL node; hence, a bypass path via a common parent device as chosen by the root network device may be inadequate to address prescribed QoS constraints between the source network device and the destination network device.

Further, in storing mode RPL topology the root network device relies on a next-hop child RPL device to forward a data packet to an identified destination in the DODAG topology, hence the root network device cannot learn about the local network topology surrounding the identified destination without substantial messaging with the intermediate network devices forming the subDAG between the source network device and the destination network device. As apparent from the foregoing, only limited routing information is readily available to the root network device regarding the overall topology of the DODAG topology; hence, the limited routing information prevents the root network device from generating an optimized P2P path between a source device and a destination device without substantial processing and/or messaging between parent network devices positioned between the source network device and the destination network device.

An alternate attempt to implement a bypass path from a source device in a first subDAG to a destination device in a second subDAG in an LLN having a tree-based DODAG topology and that bypasses a root network device may rely on a parent network device that provides the second subDAG to be able to execute promiscuous detection of a data packet transmitted by a transmitting network device to a second parent device providing the first subDAG: in this attempt the parent network device is required to send an instruction causing the second parent device to forward traffic destined for the destination device to the parent device providing the second subDAG. Such an attempt, however, is limited in scope depending on the topology between the source device in the first subDAG and the destination device in the second subDAG; hence, attempting a bypass path based on promiscuous detection may not be feasible in larger networks or more complex network topologies where the source and destination devices are further separated in the tree-based DODAG topology.

Hence, the requirement for a root network device to generate optimized routes for every single data flow between RPL nodes in a large-scale DODAG topology comprising thousands of RPL nodes would result in an NP-complete problem that cannot be completed by the root network device or any other centralized network device.

According to example embodiments, optimized P2P paths can be deployed in a scalable manner in a low-power and lossy network (LLN) having a tree-based DODAG topology comprising thousands of RPL nodes, based on a network device (e.g., a root network device, a management device, etc.) causing a destination network device (e.g., a destination RPL node) within the DODAG topology to generate its own optimized P2P path based on generating a locally-optimized tree (e.g., DAG) bypassing the root. The destination network device generates the locally-optimized tree based on initiating propagation of confined advertisement messages relative to identified network devices that are identified by the network device as part of a hop-by-hop path from a source network device to the destination network device. Each confined advertisement message (e.g., a confined DIO message identifying the destination network device as its root) can be limited in its propagation in the existing DODAG topology to the identified network devices of the hop-by-hop path and non-identified network device that are neighbors of the identified network devices. Hence, the confined advertisement message propagation can be confined toward the source network device (which joins the locally-optimized tree as a leaf node), where local RPL nodes can determine their own localized optimizations with respect to neighboring RPL nodes and join the locally-optimized tree as appropriate, with minimal disruption in the existing DODAG topology.

Hence, the example embodiments enable local optimization of P2P paths based on a destination device generating a locally-optimized tree that can guarantee prescribed quality of service (QoS) requirements in terms of latency, reliability, etc. for an identified flow of data packets, without the necessity of a centralized device (such as the root network device, a management device, etc.) calculating or installing an optimized P2P path that bypasses the root network device. Moreover, the local optimization based on the generation of a locally-optimized tree (for an identified flow of data packets) using confined advertisements enables the scalable deployment of optimized P2P paths within the large-scale DODAG topology, with minimal messaging between the RPL nodes to minimize interference with existing network traffic in the DODAG topology. A locally-optimized tree also can be implemented with a termination requirement that causes the destination device (serving as root for the locally-optimized tree) to terminate the locally-optimized tree in response to detecting execution of the termination requirement.

FIGS. 1A-1L illustrate an example low power and lossy network (LLN) 10 having a tree-based DODAG topology 12 comprising a root network device 14, and attached RPL network devices "A" through "Q" 16 within the LLN 10 rooted by the root network device 14, according to an example embodiment. FIG. 1M illustrates the LLN 10 comprising the RPL network devices 16 having established a different tree-based DODAG topology 12', where the RPL network device "H" 16 is attached to the parent RPL network device "E" 16 instead of the parent RPL network device "D" 16 as in FIGS. 1A-1L. The operations described herein apply equally to the tree-based DODAG topology 12 of FIGS. 1A-1L and the tree-based DODAG topology 12' of FIG. 1M, hence although description of the example embodiments will be described only to the tree-based DODAG topology 12 to avoid cluttering, it will be apparent that the description of the example embodiments also apply to the tree-based DODAG topology 12' of FIG. 1M as well, as described in further detail below.

Although only the RPL network devices "A", "B", and "C" are labeled with the reference numeral "16" in FIGS. 1A-1M to avoid cluttering in the Figures, it should be apparent that all the RPL network devices "A" through "Q" are allocated the reference numeral "16" for purposes of the description herein. Further, it should be apparent that all the network devices "A" through "Q" 12 are configured for establishing wireless data links and DODAG parent-child connections 18 (collectively "wireless DODAG parent-child connections"), even though only the wireless DODAG parent-child connections 18 between the root network device 14 and the RPL network devices "A" and "B" 16 are labeled with the reference numeral "18" to avoid cluttering in the Figures.

As illustrated in FIG. 1A, the LLN 10 also can include a network management device 20, for example a path computation element (PCE) configured for managing the LLN 10.

As described in further detail below, the root network device 14, the management device 20, and/or a common parent network device (e.g., "D") 16 (FIGS. 1A-1L) can determine a hop-by-hop path "N→J→G→D→H→L→P" 22 for forwarding a data packet 24 of an identified flow (e.g., "flowX") 26 from a source RPL network device "N" 16 to a destination RPL network device "P" 16. The root network device 14, the management device 20, and/or the common parent "D" 16 can determine the hop-by-hop path 22 comprises the identified network devices "N", "J", "G", "D", "H", "L", "P" having respective hop counts "6", "5", "4", "3", "2", "1", "0" 28 from the destination RPL network device "P" 16. The root network device 14, the management device 20, and/or the common parent "D" 16, upon determining the hop-by-hop path 22, can cause the destination RPL network device "P" 16 to initiate generation of a locally optimized tree 30 (30a of FIG. 1I, 30b of FIG. 1L, 30c of FIG. 1M) that bypasses the root network device 14 and optimizes forwarding of the data packet 24 in the identified flow "flowX" 26 from the source RPL network device "N" 16 to the destination RPL network device "P" 16.

Moreover, the root network device 14, the management device 20, and/or the common parent "D" 16 causes the destination RPL network device "P" 16 to initiate generation of a locally optimized tree 30 using confined advertisement messages 32 (e.g., 32a of FIG. 1B) that limit propagation toward the source RPL network device "N" 16 by the identified network devices "J", "G", "D", "H", and "L" 16 and/or neighbors of the identified network devices 16. Hence, the example embodiments enable the destination RPL network device "P" 16 to execute localized optimization of a P2P path from the source RPL network device "N" 16 to the destination RPL network device "P" 16, for an identified flow "flowX" 26, based on the destination RPL network device "P" 16 initiating generation of confined DIO advertisement messages 32 having limited propagation toward the source RPL network device "N" 16.

Figure 1B:
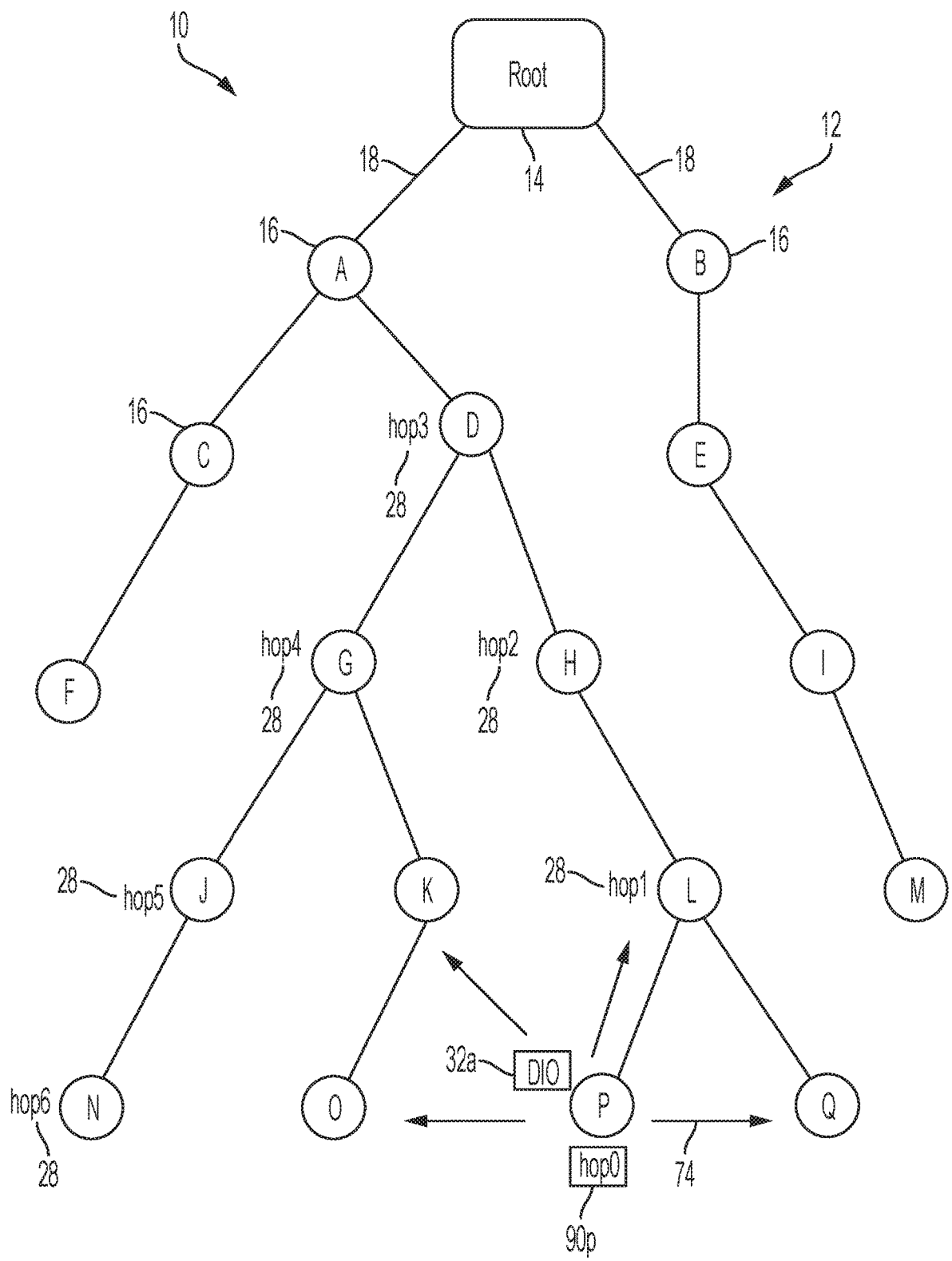
Figure 1C:
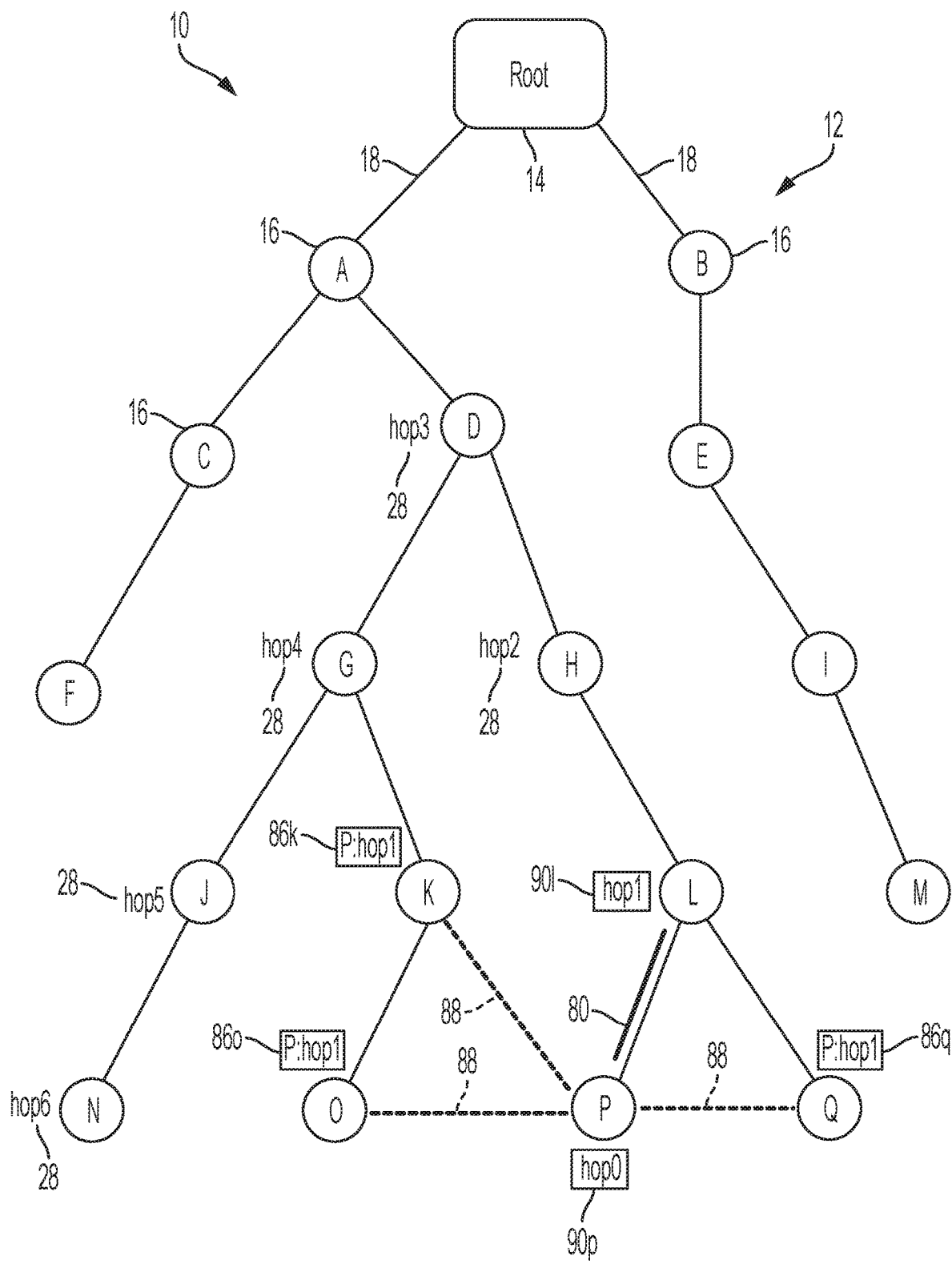
Figure 1D:
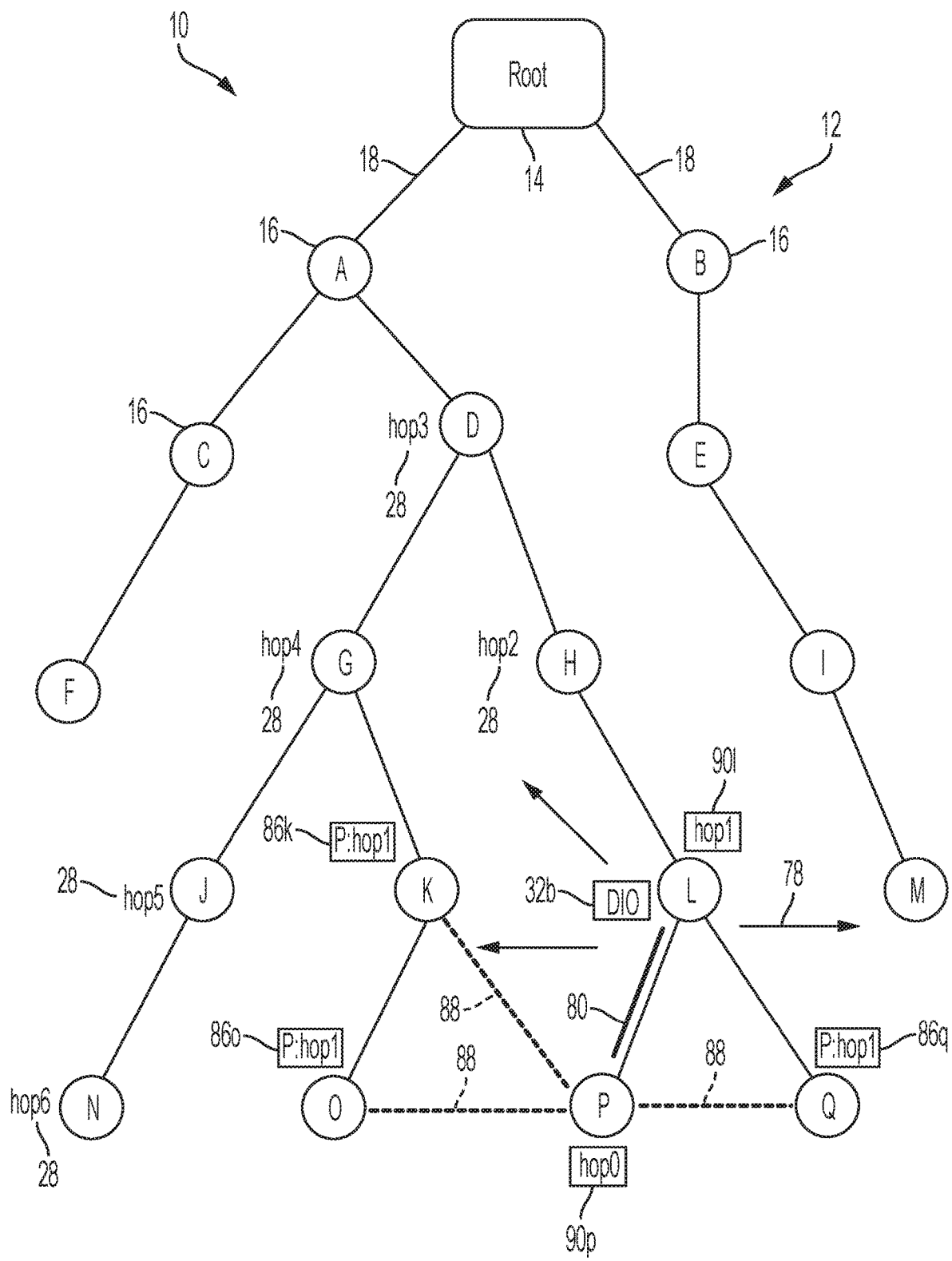
Figure 1E:
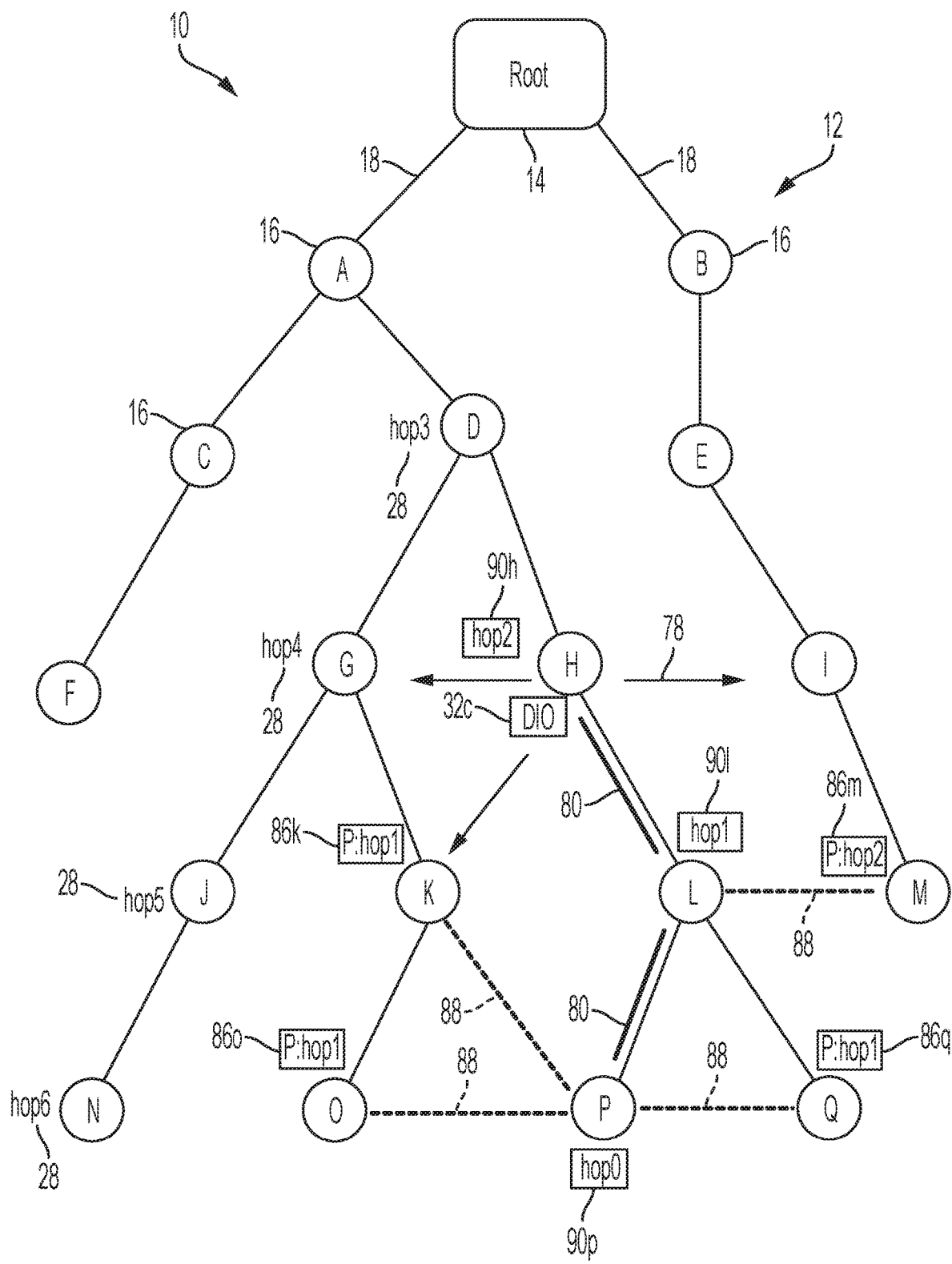
Figure 1F:
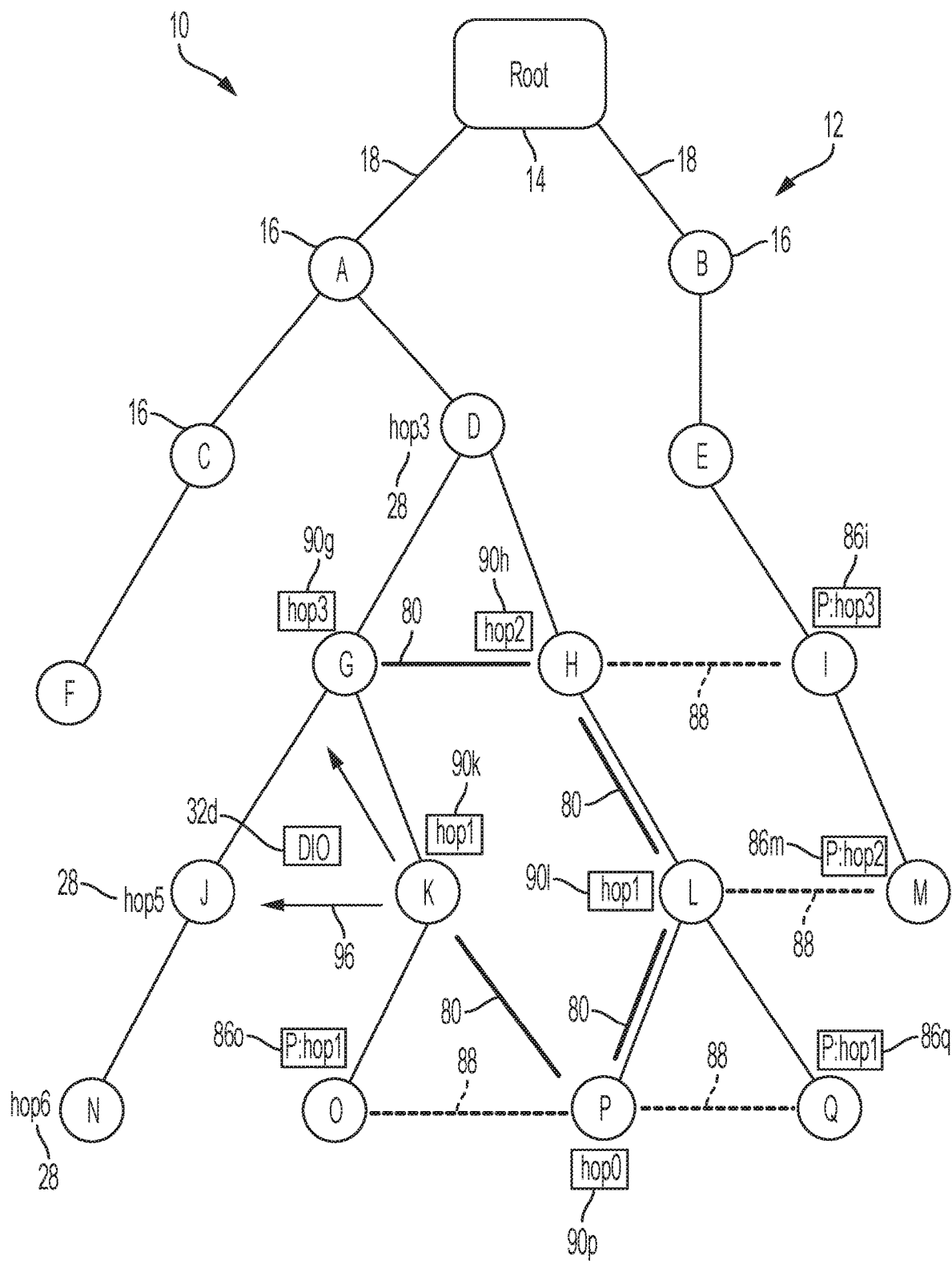
Figure 1G:
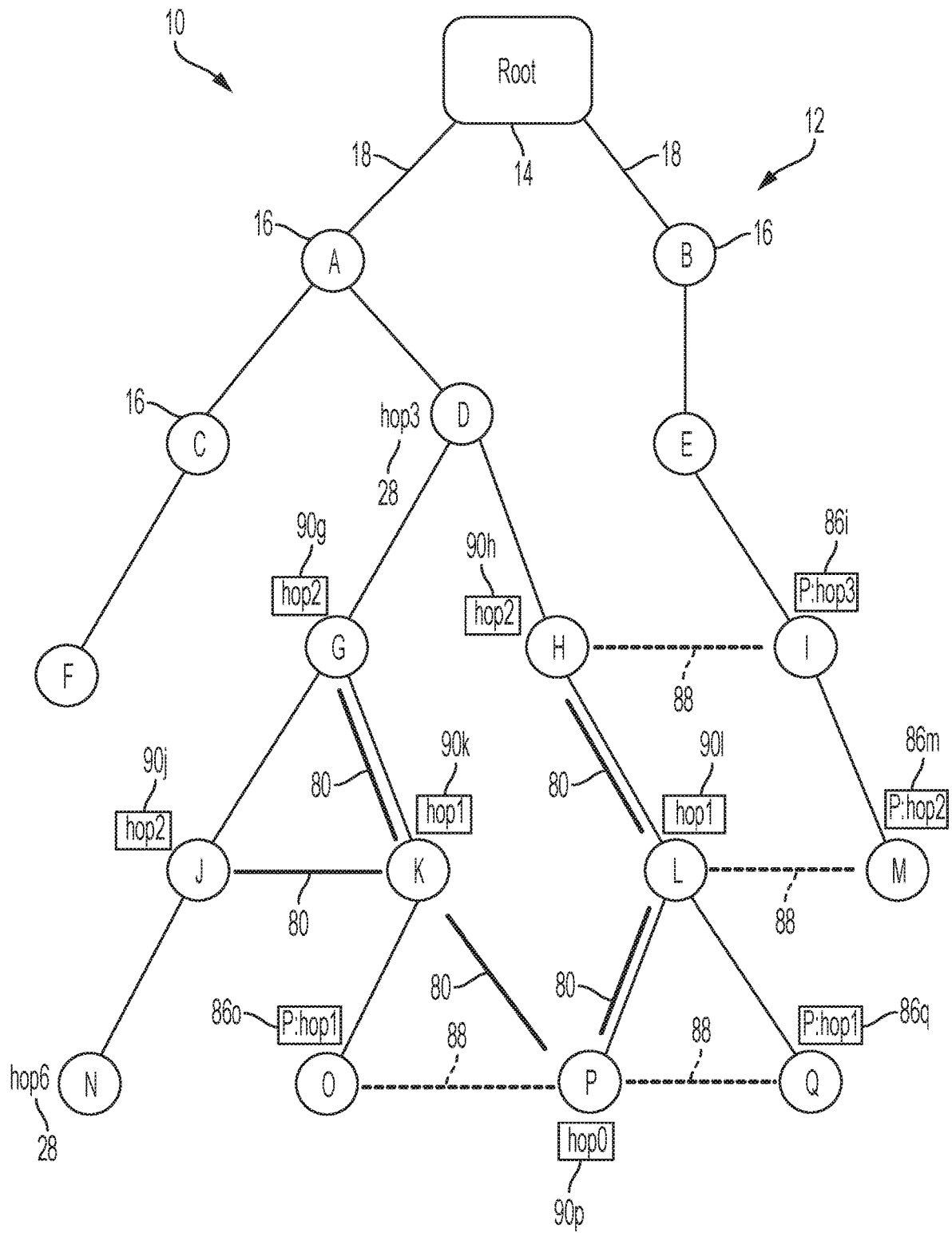
Figure 1H:
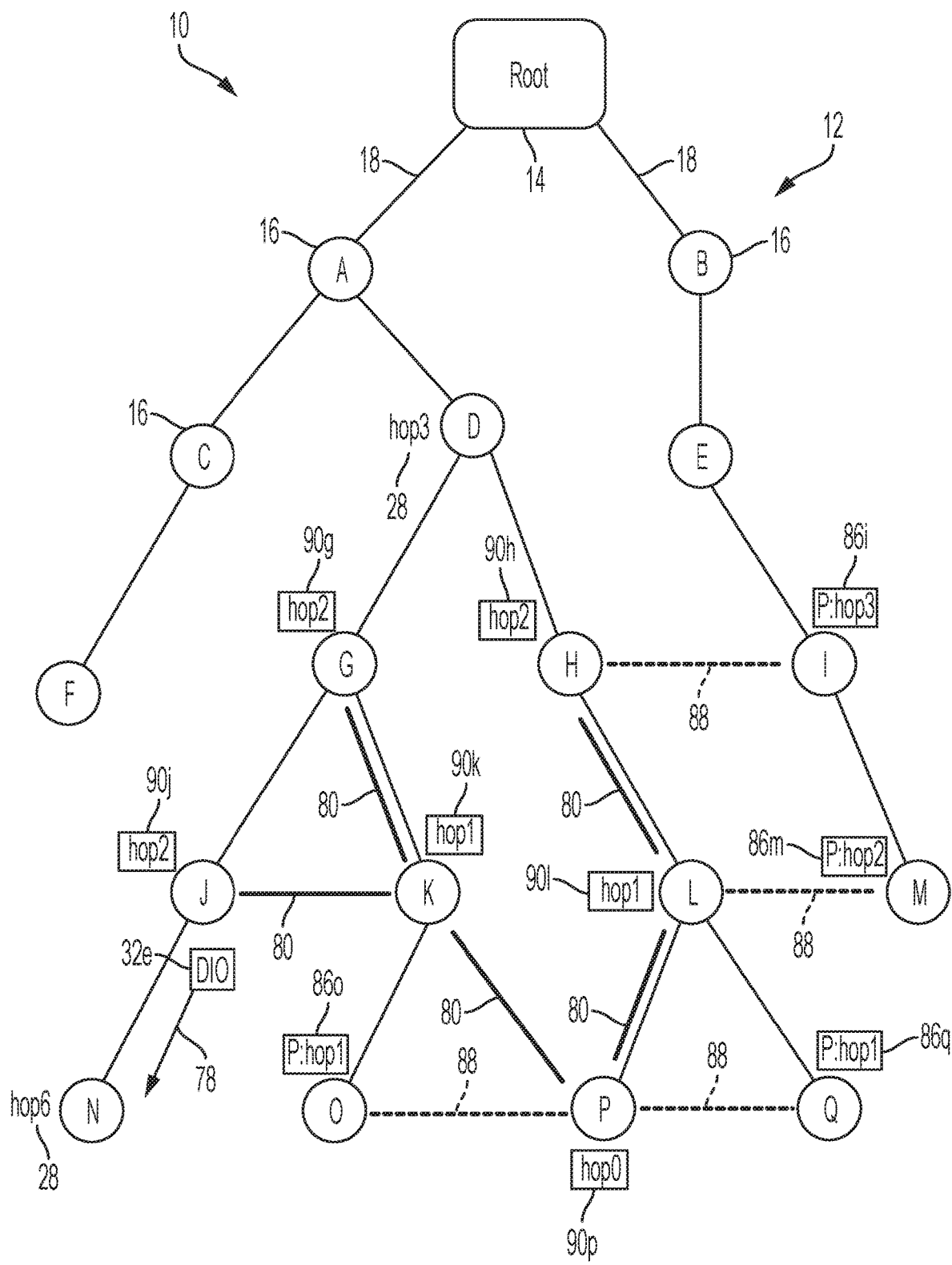
Figure 1I:
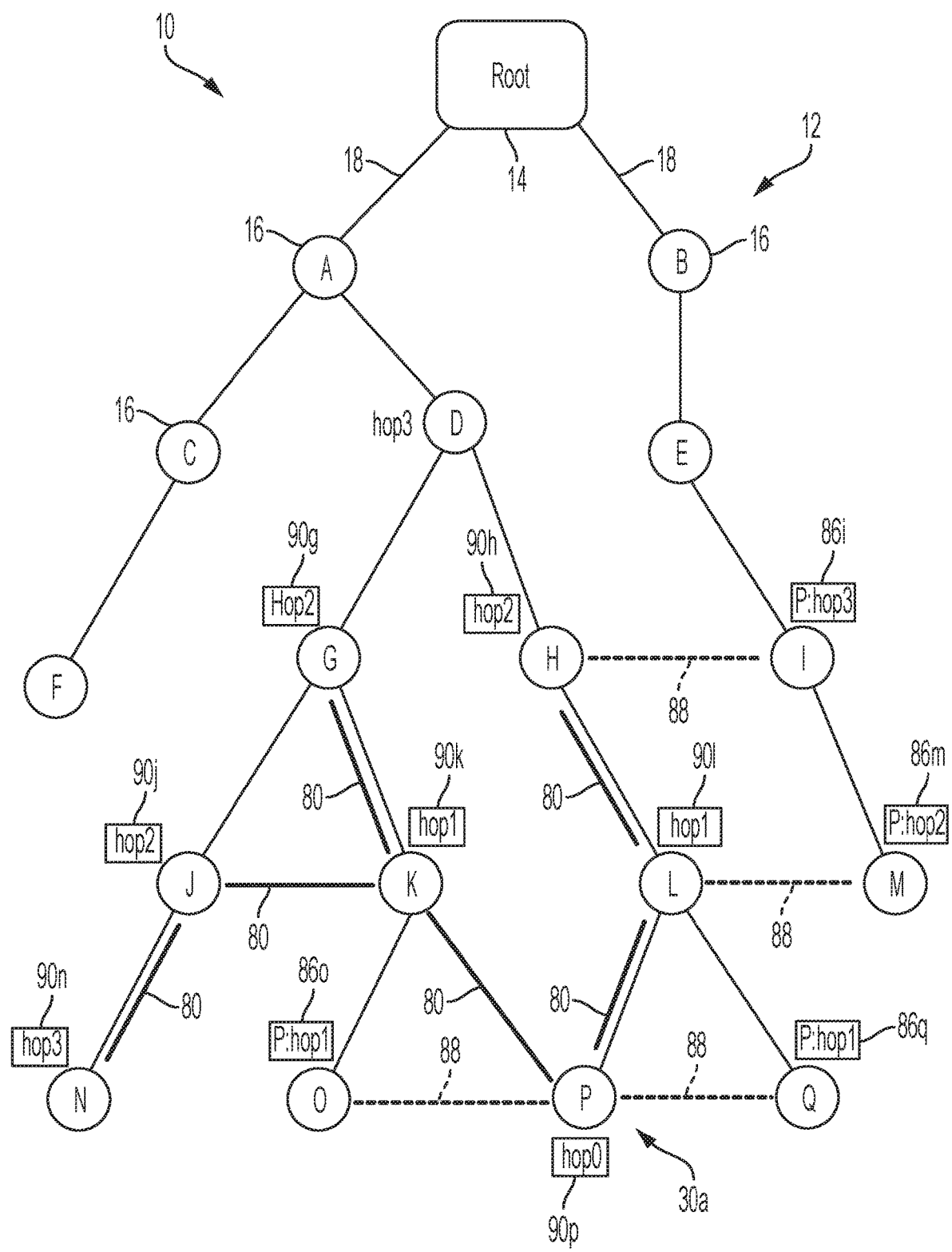
Figure 1J:
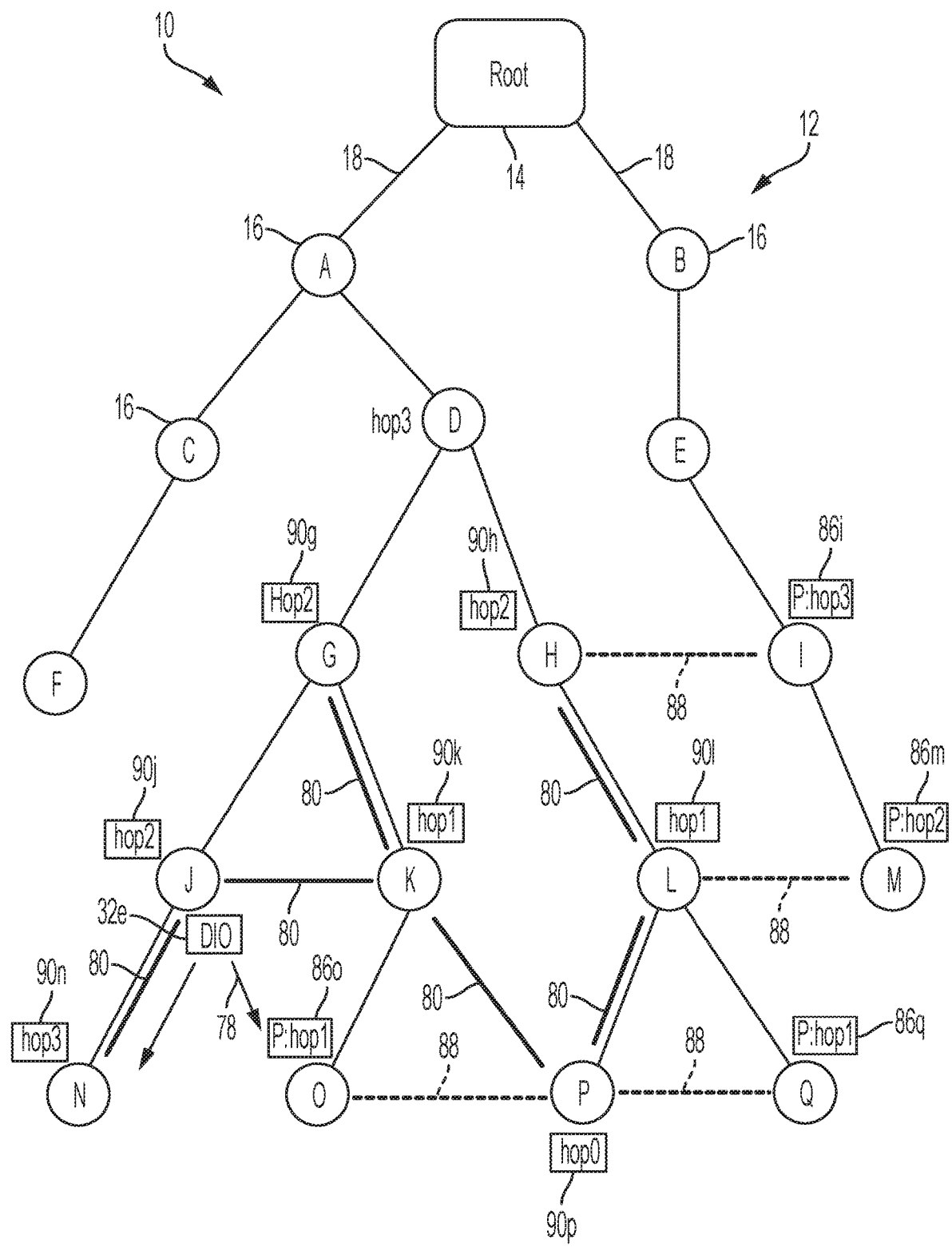
Figure 1K:
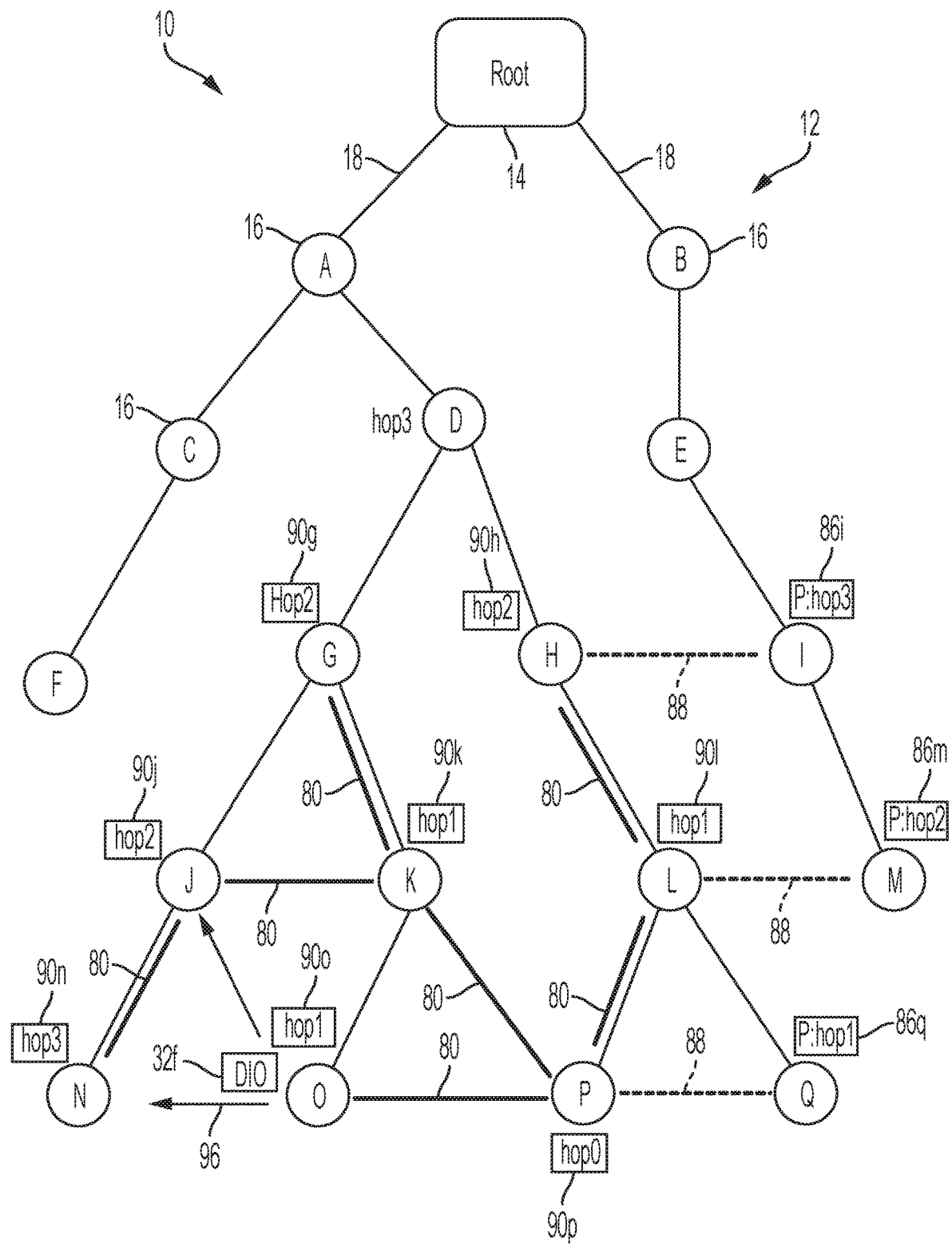
Figure 1L:
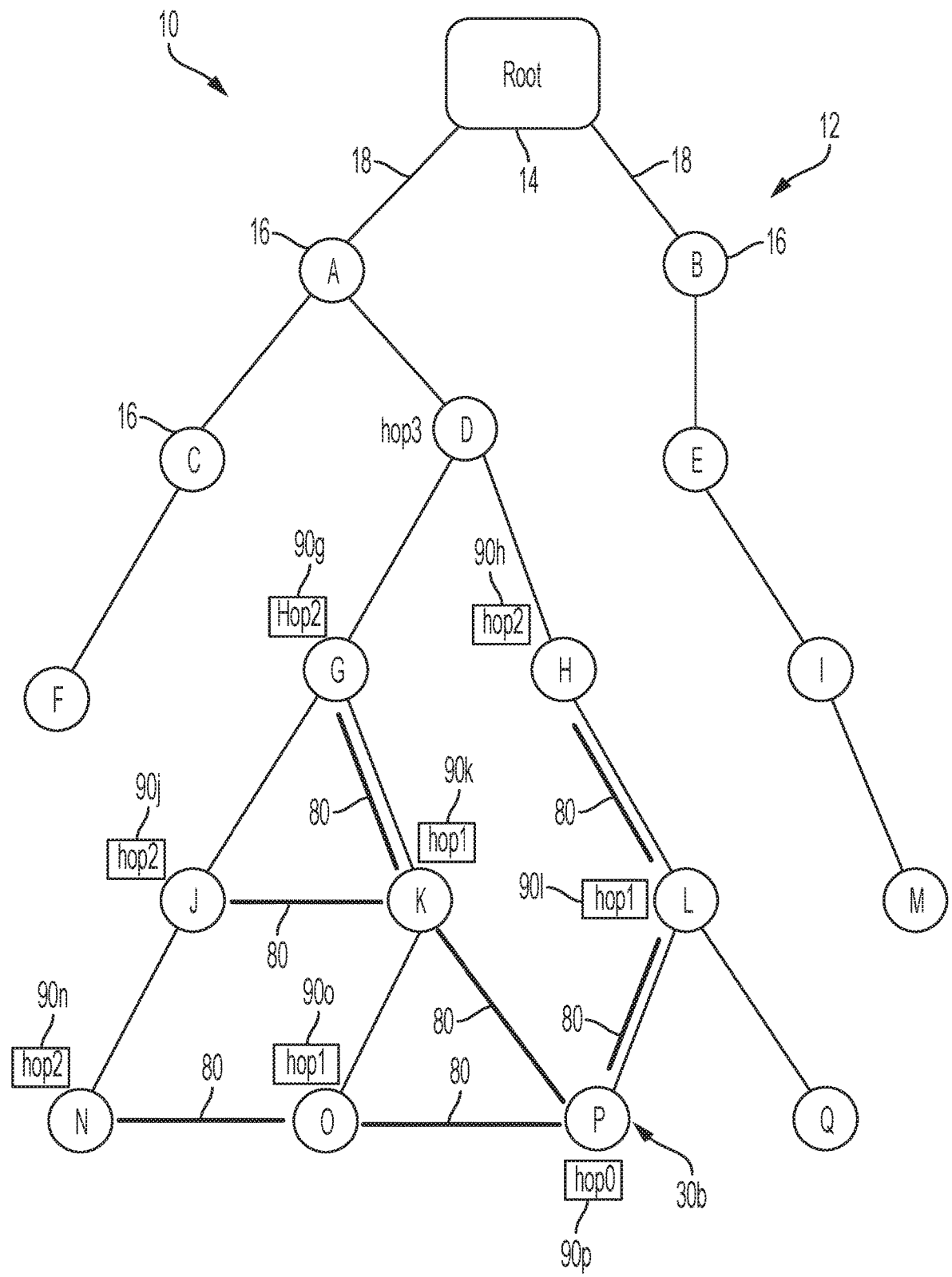
Figure 1M:
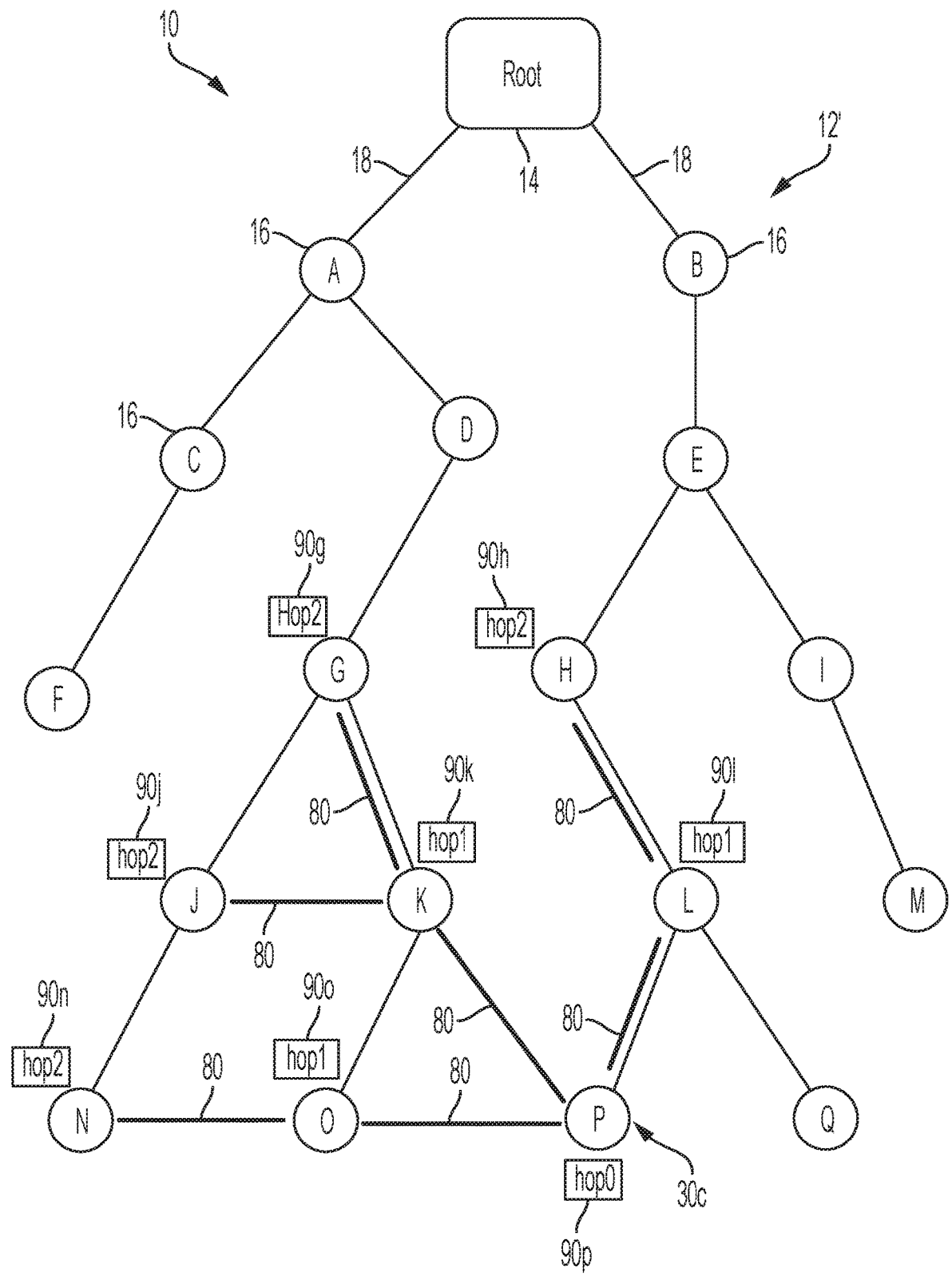
Figure 2:
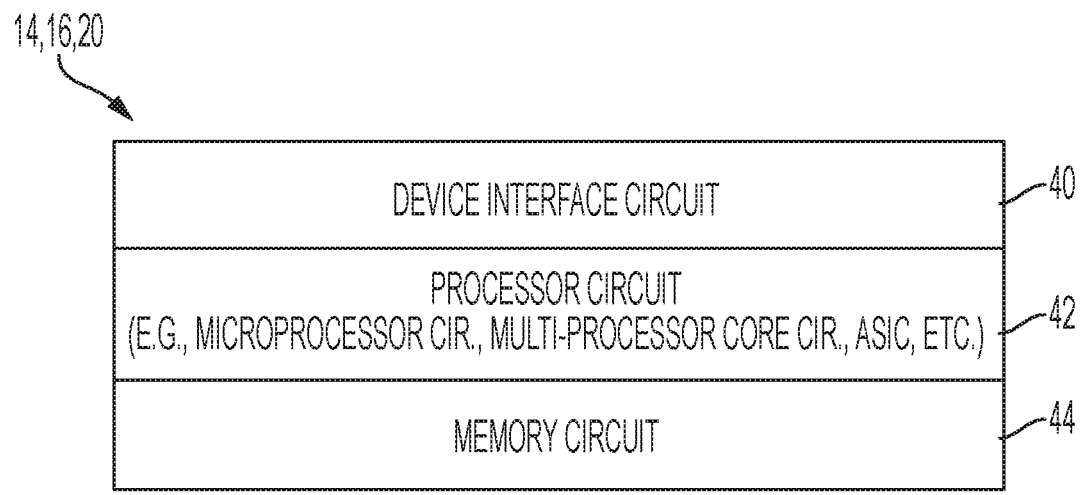
FIG. 2 is an example implementation of any one of the network devices of FIGS. 1A-1M, according to an example embodiment.

FIG. 2 illustrates an example implementation of any one of the devices 14, 16, and/or 20 of FIG. 1, according to an example embodiment. The apparatus 14, 16, and/or 20 is a physical machine (i.e., a hardware device) configured for implementing network communications with other physical machines via the low-power and lossy network 10. The term "configured for" or "configured to" as used herein with respect to a specified operation refers to a device and/or machine that is physically constructed and arranged to perform the specified operation. Hence, the apparatus 14, 16, and/or 20 is a network-enabled machine (e.g., a constrained "Internet of Things" device such as a sensor device and/or actuator device having constrained processing, memory, and/or power resources) implementing network communications via the network 10.

Each apparatus 14, 16, and/or 20 can include a device interface circuit 40, a processor circuit 42, and a memory circuit 44. The device interface circuit 40 can include one or more distinct physical layer transceivers for communication with any one of the other devices 14, 16, and/or 20; the device interface circuit 40 also can include an IEEE based Ethernet transceiver for communications with the devices of FIG. 1 via any type of data link (e.g., a wired or wireless link, an optical link, etc.) (at least the root network device 14 and/or the management device 20 can have a wired network connection, for example for wired communications in a wired communication network such as a "backbone" network (not shown)). The processor circuit 42 can be configured for executing any of the operations described herein, and the memory circuit 44 can be configured for storing any data or data packets as described herein.

Any of the disclosed circuits of the devices 14, 16, and/or 20 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
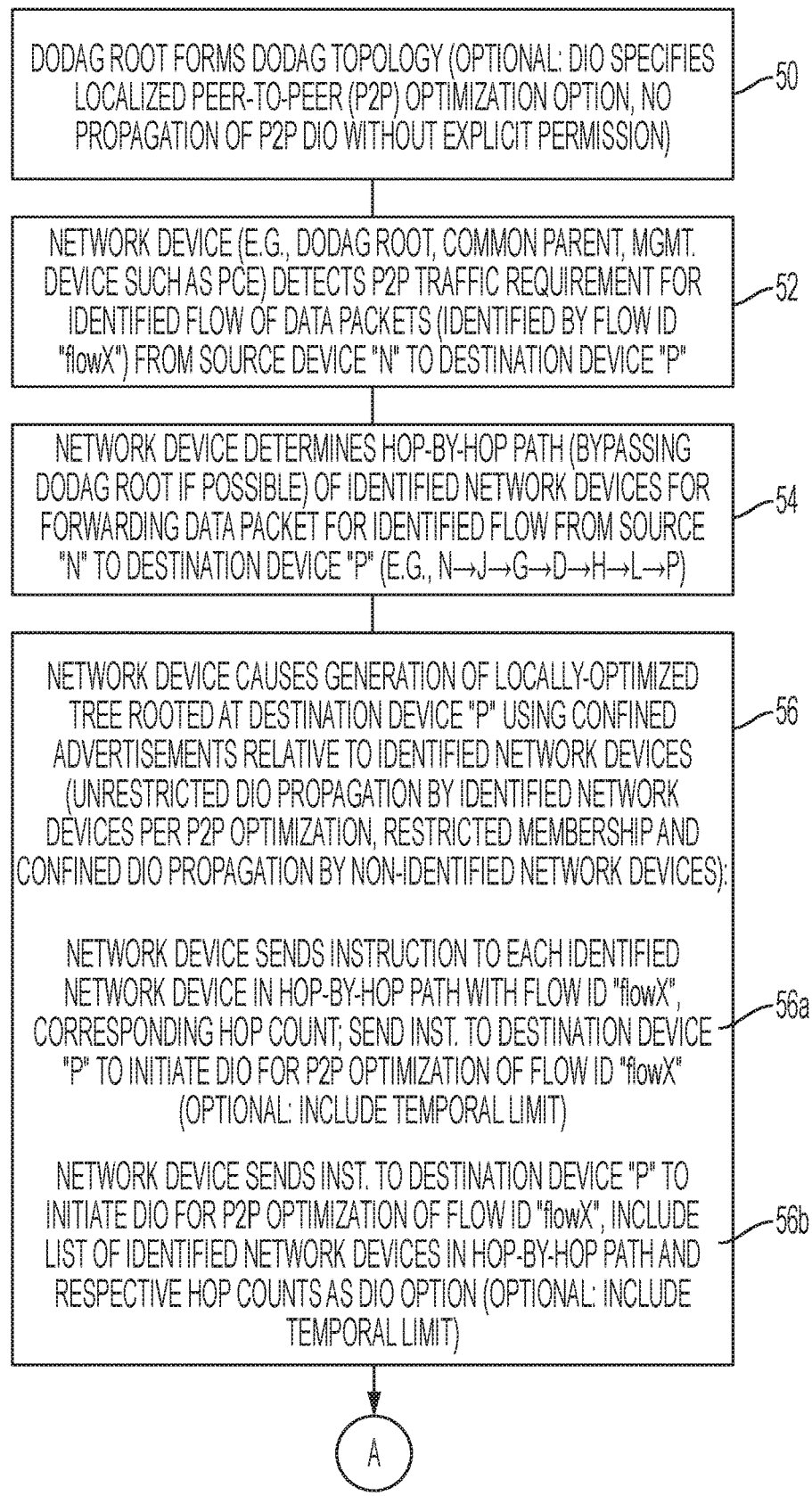
FIGS. 3A-3C illustrate an example method of generating a locally-optimized tree using confined advertisement for peer-to-peer optimization in an existing tree-based topology, according to an example embodiment.
Figure 3B:
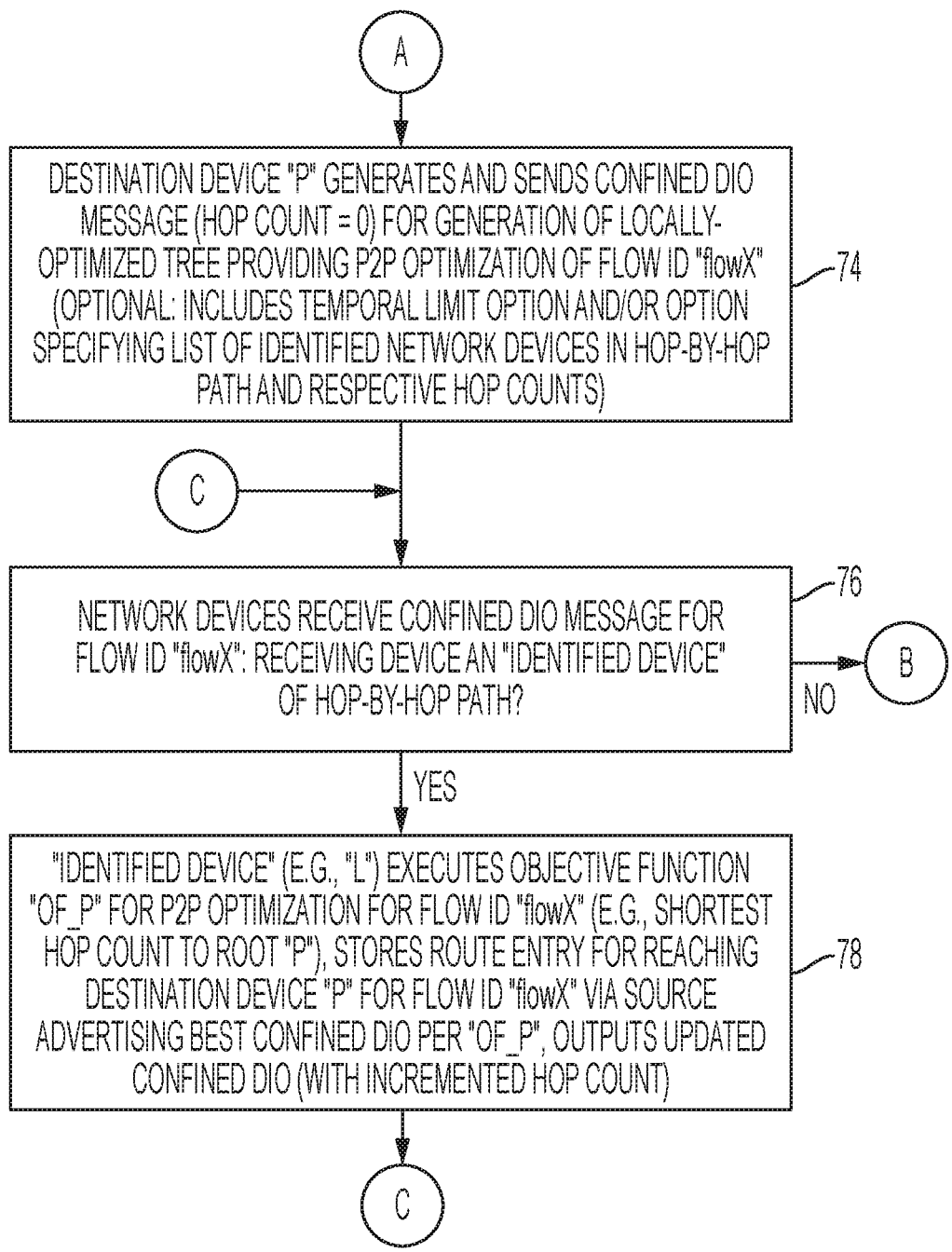
Figure 3C:
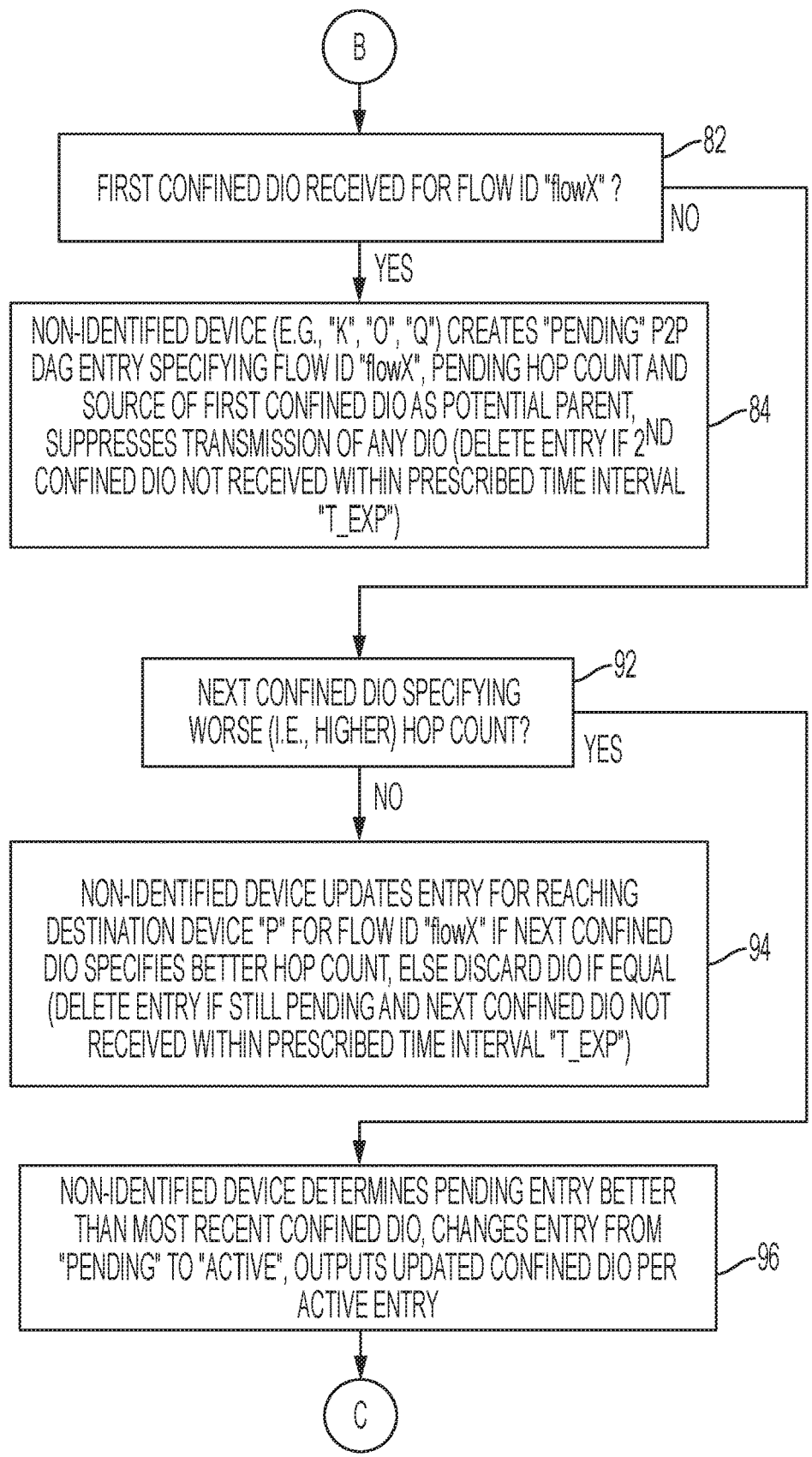

FIGS. 3A-3C illustrate an example method of causing generation of a locally-optimized tree using confined advertisement for peer-to-peer optimization in an existing tree-based topology, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the root network device (i.e., DODAG root) 14 in operation 50 can form the initial tree-based DODAG topology 12 of FIG. 1A-1L or 12' of FIG. 1M, for example based on the root network device 14 outputting a DODAG information object (DIO) advertisement message as described in the Internet Engineering Task Force (IETF) Request for Comments (RFC) 6550. As described in further detail below, the DIO message generated and output by the root network device 14 can optionally include an option field that specifies a localized P2P option that includes an instruction that no confined DIO advertisement message 32 can be propagated by any RPL network device 16 without explicit permission and/or constraints, described below. Alternately, the localized P2P option can be specified based on the root network device 14, the management device 20, and/or the common parent "D" 16 sending to the destination RPL network device "P" 16 an instruction specifying options for specifying within a confined DIO advertisement message 32 options specifying rules for confined membership in the locally-optimized tree 30 and confined propagation of the confined DIO advertisement message 32, described below.

Each RPL network device 16, in response to receiving a root-initiated DIO message, can form an attachment within the tree-based DODAG topology 12 via a corresponding wireless DODAG parent-child connection 18 with either the root network device 14 (e.g., as in the case of RPL nodes "A" and "B" attaching to the root network device 14), or via a corresponding wireless DODAG parent-child connection 18 with a parent network device attached within the tree-based DODAG topology 12 or 12' (e.g., as in the case of RPL node "C" attaching to parent RPL node "A", RPL node "E" attaching to parent RPL node "B", etc.). As described in RFC 6550, each RPL network device 16, in response to the root network device 14 and/or a parent RPL network device 16 in the tree-based DODAG topology 12, can output an updated DIO message specifying the corresponding "rank" (e.g., hop count) of the RPL network device 16 relative to the root network device 14, enabling other network devices to join the tree-based DODAG topology 12 or 12' resulting in the tree-based DODAG topology 12 of FIGS. 1A-1L and/or 12' of FIG. 1M.

As illustrated in FIG. 1A, the source RPL network device "N" 16 can begin transmitting a data packet 24 to the destination RPL network device "P" 16 via the hop-by-hop path 22. Depending on implementation, the processor circuit 42 of any one of the root network device 14, the management device 20, and/or the common parent "D" 16 in operation 52 can detect a P2P traffic requirement for the identified flow "flowX" 26 of data packets generated by the source RPL network device "N" 16 and destined for the destination RPL network device "P" 16. For example, in storing mode, the common parent device "D" can detect the identified flow "flowX" 26 of data packets 24 from the source RPL network device "N" 16 to the destination RPL network device "P" 16, and report the flow to the root network device 14 and/or the management device 20, if needed; in non-storing mode, since the root network device 14 receives all "upward" data packets 24 (i.e., upward toward the root network device 14), the processor circuit 42 of the root network device 14 in operation 52 can detect the forwarding of the data packet 24 to the destination RPL network device "P" 16, and report the flow to the management device 20, if needed.

The processor circuit 42 of any one of the root network device 14, the management device 20, and/or the common parent "D" 16 in operation 54 can determine the hop-by-hop path 22 of identified network devices 16 forwarding a data packet 24 from the source RPL network device "N" 16 to the destination RPL network device "P" 16. As illustrated in FIGS. 1A and 3A, any one of the root network device 14, the management device 20, and/or the common parent "D" 16 can determine the hop-by-hop path 22 as the hop-by-hop sequence "N→G→D→H→L→P" in the tree-based DODAG topology 12, or "N→G→D→A→Root-→B→E→H→L→P" in the tree-based DODAG topology 12' of FIG. 1M. For example, if the tree-based DODAG topology 12 or 12' is implemented as a storing mode topology, the common parent "D" 16 can detect the flow of data packets 24 originated by the source RPL network device "N" 16, and optionally identify each of the parents "G" and "J" for reaching source RPL network device "N" 16, and each of the parents "H", "L" for reaching the destination RPL network device "P" 16 in the tree-based DODAG topology 12 (e.g., by sending queries downward toward each of the source RPL network device "N" 16 and the destination RPL network device "P" 16 to determine the hop-by-hop path "G"-"J"-"N" to the source RPL network device "N" 16, and the hop-by-hop path "H"-"L"-"P" to the destination RPL network device "P" 16); the root network device 14 can execute similar operations for determining the corresponding hop-by-hop path 22 in the tree-based DODAG topology 12' of FIG. 1M.

In non-storing mode, the root network device 14 in operation 52 receives each data packet 24 and stores source-route entries for reaching each of the RPL network devices 16 in the tree-based DODAG topology 12 or 12'. Hence, the processor circuit 42 of the root network device 14 and/or the management device 20 can determine the hop-by-hop path 22 based on locating the common parent (if any) between the source-route paths used to reach the source RPL network device "N" 16 and the destination RPL network device "P" 16.

In response to determining the hop-by-path (e.g., "N→G→D→H→L→P" in the tree-based DODAG topology 12, or "N→G→D→A→Root→B→E→H→L→P" in the tree-based DODAG topology 12' of FIG. 1M), the processor circuit 42 of any one of the root network device 14, the management device 20, and/or the common parent "D" 16 in operation 56 can cause generation of a locally-optimized tree 30 (e.g., 30a in FIG. 1I, 30b in FIG. 1L, and/or 30c of FIG. 1M) providing a P2P optimization of the identified flow "flowX" 26 of data packets 24 from the source RPL network device "N" 16 to the destination RPL network device "P" 16. In particular, the processor circuit 42 of any one of the root network device 14, the management device 20, and/or the common parent "D" 16 in operation 56 can cause the destination RPL network device "P" 16 to initiate generation of the locally-optimized tree 30 that bypasses the root network device 14, based on the root network device 14, the management device 20, and/or the common parent "D" 16 sending in operation 56 an instruction causing the destination RPL network device "P" 16 to output a confined DIO advertisement message (32a of FIG. 1B) relative to the identified network devices in the hop-by-hop path 22. As described below, the confined DIO advertisement message 32 allows selected DIO propagation by identified network devices in the hop-by-hop path 22 (subject to satisfying objective function constraints, described below), but restricts membership in the locally-optimized tree 30 and restricts propagation of the confined DIO advertisement message 32 by non-identified network devices that are not identified in the hop-by-hop path 22.

For example, the processor circuit 42 of any one of the root network device 14, the management device 20, and/or the common parent "D" 16 in operation 56a can send a corresponding instruction to each of the identified network devices "J", "G", "D", "H", "L", where the corresponding instruction specifies the corresponding hop count 28 of the identified network device in the hop-by-hop path 22 for reaching the destination RPL network device "P" 16 for the identified flow "flowX" 26; the instruction sent to each identified network device "J", "G", "D", "H", "L" also can specify a termination requirement (e.g., a temporal limit or "lifetime" of the locally-optimized tree 30) that will cause the destination RPL network device "P" 16 to terminate the locally-optimized tree 30. The processor circuit 42 of any one of the root network device 14, the management device 20, and/or the common parent "D" 16 in operation 56a also can send to the destination RPL network device "P" 16 an instruction (specifying the flow identifier for the identified flow "flowX" 26, and the termination requirement) for the destination RPL network device "P" 16 to initiate transmission of the confined DIO advertisement message 32a, illustrated in FIG. 1B, to begin generation of the locally-optimized tree 30.

As an alternative to sending an instruction in operation 56a to each of the identified network devices "J", "G", "D", "H", "L" that are configured for forwarding a data packet 24 along the hop-by-hop path 22 from the source RPL network device "N" 16 to the destination RPL network device "P" 16, the processor circuit 42 of any one of the root network device 14, the management device 20, and/or the common parent "D" 16 in operation 56b can send to the destination RPL network device "P" 16 an instruction that includes not only the flow identifier for the identified flow "flowX" 26, and the termination requirement, but that also specifies a list (58 of FIG. 4) of the identified network devices "J", "G", "D", "H", "L" and the source RPL network device "N" 16 and respective hop counts 28, and membership/propagation rules (60 of FIG. 4) for the identified network devices (i.e., "tagged nodes") and non-identified network devices (e.g., "K", "M", "O", "Q" etc.) that enable the destination RPL network device "P" 16 to generate a confined DIO advertisement message 32'. Hence, the processor circuit 42 of any one of the root network device 14, the management device 20, and/or the common parent "D" 16 in operation 56b can send an instruction specifying all of the parameters necessary for the destination RPL network device "P" 16 to generate and output the confined DIO advertisement message 32', illustrated in FIG. 4.

Figure 4:
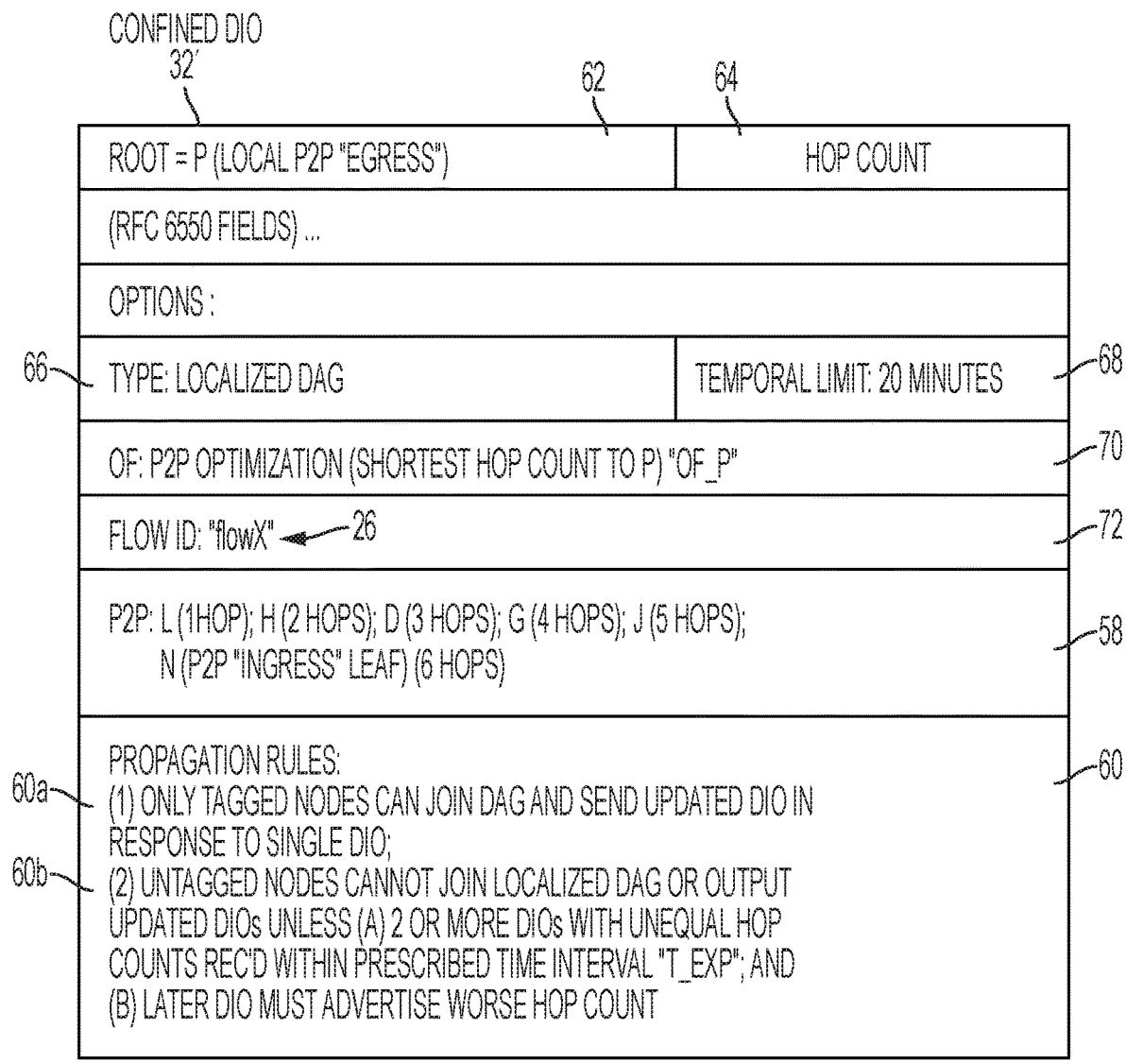
FIG. 4 illustrates an example confined advertisement output by a network device for generation of the locally-optimized tree, according to an example embodiment.

FIG. 4 illustrates an example confined advertisement 32' output by the destination RPL network device "P" 16 for initiating generation of the locally-optimized tree 30, according to an example embodiment. The confined DIO advertisement message 32' of FIG. 4 can include a root identifier field 62 specifying the destination RPL network device "P" 16 (e.g., as a local P2P egress node of a P2P-optimized DAG), a "rank" (e.g., hop count) field 64 specifying the "rank" or hop count of the RPL network device 16 transmitting the confined DIO advertisement message 32 in accordance with RFC 6550, and additional fields as specified in RFC 6550.

The confined DIO advertisement message 32' also can specify option fields that describe the selective membership and/or selective suppression of the confined DIO advertisement message 32' in the LLN 10, for example a type field 66 that specifies the confined DIO advertisement message 32' is for generation of a localized DAG, a termination requirement field 68 that specifies a termination requirement for the locally-optimized tree 30, where the locally-optimized tree 30 is terminated in the LLN 10 upon execution of the specified termination requirement: as illustrated in FIG. 4, the termination requirement field 68 can specify a temporal limit of twenty (20) minute duration for the locally-optimized tree 30, a specific date and/or time that the locally-optimized tree 30 is to be terminated, a byte count or packet count, etc. indicating the destination RPL network device "P" 16 is to terminate the locally-optimized tree 30 upon the destination RPL network device "P" 16 receiving the specified amount of data, and/or a source-control indicator that the destination RPL network device "P" 16 is to terminate the locally-optimized tree 30 upon receipt of a prescribed command from the source RPL network device "N" 16, etc.

The confined DIO advertisement message 32' also can specify an objective function field 70 specifying that the objective function "OF_P" for the locally-optimized tree 30 is for P2P optimization using the shortest hop count to the destination RPL network device "P" 16 (and/or other prescribed QoS constraints), and a flow identifier field 72 specifying the identified flow "flowX" 26. As indicated previously the list 58 specifies the source RPL network device "N" 16 as an "ingress leaf" node for the locally-optimized tree 30, the identified network devices "J", "G", "D", "H", "L", and the respective hop counts "6", "5", "4", "3", "2", "1" 28 from the destination RPL network device "P" 16.

The membership/propagation rules 60 in the confined DIO advertisement message 32' can specify tagged propagation rules 60a for execution by the identified network devices in the hop-by-hop path 22, and untagged propagation rules 60b for execution by any RPL network device 16 that is not identified as in the hop-by-hop path 22. As described previously, the tagged propagation rules 60a can be sent by any one of the root network device 14, the management device 20, and/or the common parent "D" 16 in operation 56a to each of the identified network devices in the hop-by-hop path 22, and the untagged propagation rules 60b can be sent by the root network device 14 in operation 50 as part of the localized P2P optimization option in the root-initiated DIO to ensure prevention of unrestricted transmission of a confined DIO advertisement message 32. Hence, in one embodiment the rules 60a and 60b can be deployed by the root network device 14, and in another embodiment the rules 60a and 60b can be transmitted in the confined DIO advertisement message 32' as illustrated in FIG. 4. The membership/propagation rules 60 will be described in further detail below with respect to FIGS. 3B and 3C.

Referring to FIGS. 1B and 3B, the destination RPL network device "P" 16 in operation 74 responds to reception of the instructions from the root network device 14 in operation 56a by creating in its memory circuit 44 a P2P DAG entry 90p specifying the destination RPL network device "P" 16 is the root (hop0) for a locally-optimized tree 30 for the identified flow "flowX" 26, and by generating and outputting a confined DIO advertisement message 32a that advertises the destination RPL network device "P" 16 as the root of the locally-optimized tree 30 providing P2P optimization for the identified flow "flowX" 26 of data packets 24 from the source RPL network device "N" 16 to the destination RPL network device "P" 16.

The destination RPL network device "P" 16 also stores in its P2P DAG entry 90p the termination requirement (as instructed by any one of the root network device 14, the management device 20, and/or the common parent "D" 16 in operation 56) that causes the destination RPL network device "P" 16 to terminate the locally-optimized tree 30 for the identified flow "flowX" 26 in response to detecting execution of the termination requirement (e.g., after expiration of the temporal limit).

As described previously, the confined DIO advertisement message 32a can be transmitted without the options 58, 60 illustrated in FIG. 4 if the root network device 14 has transmitted the untagged propagation rules 60b in operation 50, and if the root network device 14 in operation 56b transmitted the tagged propagation rules 60a to each of the identified network devices in the hop-by-hop path 22; alternately, the destination RPL network device "P" 16 can include the options 58, 60, as illustrated in the confined DIO advertisement message 32' of FIG. 4, if the root network device 14 executed operation 56b.

As illustrated in FIG. 1B, the confined DIO advertisement message 32a transmitted by the destination RPL network device "P" 16 in operation 74 can be detected by the neighboring network devices "K", "L", "O", and "Q" 16. Each of the neighboring network devices "K", "L", "O", and "Q" 16 in operation 76 can respond to the received confined DIO advertisement message 32a based on determining whether the corresponding neighboring network device is an "identified device" in the hop-by-hop path 22, for example based on the instructions received from the root network device 14 in operation 56a, or alternately based on parsing a list 58 of identified network devices in the received confined DIO advertisement message 32a.

The neighboring network device "L" 16 in operation 76 can determine (from its received instruction from the root network device 14 in operation 56a and/or the list 58 of identified network devices in the received confined DIO advertisement message 32a) that it is an "identified device" in the hop-by-hop path 22, and in response the neighboring network device "L" 16 in operation 78 can execute the objective function "OF_P" identified in the objective function field 70 of the received confined DIO advertisement message 32a (e.g., selectively joining to the transmitting parent network device "P" 16 based on the shortest hop count) and identify the transmitting parent device "P" 16 is zero (0) hops from the destination RPL network device "P" 16 operating as the local P2P egress root for the locally-optimized tree 30.

In response to executing the objective function "OF_P" based on the confined DIO advertisement message 32a, the neighboring network device "L" 16 can selectively join in operation 78 the locally-optimized tree 30 as a child of the parent destination RPL network device "P" 16 that transmitted the confined DIO advertisement message 32a, based on storing in its memory circuit 44 a P2P DAG entry 90l specifying one ("1") hop for reaching the destination RPL network device "P" 16 via a locally-optimized connection 80 for the locally-optimized tree 30, illustrated in FIG. 1C. The neighboring network device "L" 16 in operation 78 also stores in its P2P DAG entry 90l the termination requirement (e.g., as specified in the termination requirement field 68 and/or instructed by any one of the root network device 14, the management device 20, and/or the common parent "D"

16 in operation 56b) that causes the neighboring network device "L" 16 to delete the P2P DAG entry 90l in response to detecting execution of the termination requirement (e.g., after expiration of the temporal limit).

The neighboring network device "L" 16 in operation 78 also can initiate generation and transmission of an updated confined DIO advertisement message 32b, illustrated in FIG. 1D, specifying that the destination RPL network device "P" 16 (operating as the root of the locally-optimized tree 30 for the identified flow "flowX" 26) is reachable in one hop via the neighboring network device "L" 16.

Each of the neighboring network devices "K", "O", and "Q" 16 in FIGS. 1B and 1C responds to reception of the confined DIO advertisement message 32a by determining in operation 76 that it is not an "identified device" of the hop-by-hop path 22, based on a determined absence of any instruction from the root network device 14 in operation 56a, and/or a determined absence of a corresponding identifier in the list 58 of identified network devices (if included in the received confined DIO advertisement message 32a). Hence, each "non-identified" network device "K", "O", and "Q" 16 in operation 82 of FIG. 3C, in response to determining the confined DIO advertisement message 32a is the first received confined DIO message for the locally-optimized tree 30 of the identified flow "flowX" 26, can create in operation 84 a corresponding "pending" (i.e., inactive candidate) P2P DAG entry 86 that specifies the identified flow "flowX" 26 (not shown in the Figures), the pending hop count of the corresponding "non-identified" network device "K", "O", or "Q" 16, and the source "P" of the first confined DIO advertisement message 32a received by the corresponding "non-identified" network device "K", "O", or "Q" 16. As illustrated in FIG. 1C, each of the "non-identified" network devices "K", "O", or "Q" have a corresponding pending P2P DAG entry 86k, 86o, and 86q specifying one hop to the destination RPL network device "P" 16.

Each of the "non-identified" neighboring network devices "K", "O", and "Q" 16 in operation 84 also suppress transmission of any confined DIO advertisement message 32, in accordance with the untagged propagation rules 60b in the instructions from the RPL network device 16 in operation 50 and/or specified in the confined DIO advertisement message 32a. As illustrated in FIG. 4, the instructions (from the root network device 14 or in the confined DIO advertisement message 32a) specify that untagged nodes cannot join the locally-optimized tree 30 or output any updated confined DIO advertisement message 32 unless: two or more confined DIO advertisement messages 32 with unequal hop counts are received within a prescribed expiration time interval "T_EXP", and the later-received confined DIO advertisement message 32 must specify a worse hop count than provided by corresponding pending P2P DAG entry 86 (indicating the "non-identified" network device has a better path to reach the destination RPL network device "P" 16 than the source of the later-received confined DIO advertisement message 32). Each "non-identified" neighboring network device "K", "O", and "Q" 16 also inserts into its corresponding pending P2P DAG entry 86 the prescribed expiration time interval "T_EXP" specifying the maximum duration the corresponding "non-identified" neighboring network device can wait to receive the next confined DIO advertisement message 32 before deleting the pending P2P DAG entry 86 (the pending P2P DAG entry 86 also can specify the termination requirement as specified in the termination requirement field 68 of the confined DIO advertisement message 32).

Hence, FIG. 1C illustrates the "non-identified" neighboring network devices "K", "O", and "Q" 16 as containing the respective pending P2P DAG entries 86k, 86o, and 86q, while suppressing any transmission of an updated confined DIO advertisement message 32. The dotted lines 88 indicate pending connections to the locally-optimized tree 30 that cannot yet be used until the untagged propagation rules 60b have been satisfied.

Referring to FIG. 1D, the neighboring network devices "H", "K", and "M" 16 receive in operation 76 the confined DIO advertisement message 32b transmitted by the network device "L" 16.

As described previously with respect to the RPL network device "L" 16, the RPL network device "H" in operation 76 can determine (from its received instruction from the root network device 14 in operation 56a and/or the list 58 of identified network devices in the received confined DIO advertisement message 32a) that it is an "identified device" in the hop-by-hop path 22, and in response can execute in operation 78 the objective function "OF_P" and identify the transmitting parent device "L" 16 is one (1) hop from the destination RPL network device "P" 16 operating as the local P2P egress root for the locally-optimized tree 30. In response to executing the objective function "OF_P" based on the confined DIO advertisement message 32b, the neighboring network device "H" 16 can join in operation 78 the locally-optimized tree 30 as a child of the transmitting parent device "L" 16 that transmitted the confined DIO advertisement message 32b, based on storing in its memory circuit 44 a P2P DAG entry 90h specifying two ("2") hops for reaching the destination RPL network device "P" 16 via a corresponding locally-optimized connection 80 for the locally-optimized tree 30, illustrated in FIG. 1E. The neighboring network device "H" 16 in operation 78 also stores in its P2P DAG entry 90h the termination requirement as described previously with respect to the network device "L" 16.

The RPL network device "H" 16 in operation 78 also can initiate generation and transmission of an updated confined DIO advertisement message 32c, illustrated in FIG. 1E, specifying that the destination RPL network device "P" 16 is reachable in two hops via the RPL network device "H" 16.

As described previously with respect to network devices "K", "O", and "Q" 16 in FIGS. 1B and 1C, each of the neighboring network devices "K" and "M" 16 responds to reception of the confined DIO advertisement message 32b in FIG. 1D by determining in operation 76 that it is not an "identified device" of the hop-by-hop path 22, and determining whether in operation 82 the confined DIO advertisement message 32b is the first confined DIO advertisement message received for the identified flow "flowX" 26. The neighboring non-identified network device "M" 16 can determine in operation 82 that the confined DIO advertisement message 32b is the first received DIO message for the identified flow "flowX" 26, and in response execute operation 84 as described previously, including creating the pending P2P DAG entry 86m as illustrated in FIG. 1E, and suppressing any transmission of any updated confined DIO advertisement message 32.

The neighboring non-identified network device "K", having already received the first confined DIO advertisement message 32a (as indicated by the pending P2P DAG entry 86k), responds in operation 82 to reception of the next confined DIO advertisement message 32b in FIG. 1D by determining in operation 92 whether the next confined DIO advertisement message 32b specifies a worse hop count than provided by the pending P2P DAG entry 86k stored in the neighboring non-identified network device "K". Since the confined DIO advertisement message 32b specifies a one (1) hop for reaching the destination RPL network device "P" 16, the confined DIO advertisement message 32b specifies an equal hop count as provided by the neighboring non-identified network device "K" as indicated in the pending P2P DAG entry 86k; hence, the neighboring non-identified network device "K" 16 in operation 94 discards the confined DIO advertisement message 32b (specifying the equal hop count) and suppresses any transmission of any updated confined DIO advertisement message 32.

Referring to FIG. 1E, the RPL network device "H" 16 in operation 78 outputs the confined DIO advertisement message 32c specifying reachability to the destination RPL network device "P" 16 in two (2) hops for the identified flow "flowX" 26. The RPL network device "I" 16 in operation 76 determines it is not an "identified device" as described previously, and determines in operation 82 that the confined DIO advertisement message 32c is the first confined DIO advertisement message 32 for the identified flow "flowX" 26. Hence, the network device "I" 16 executes operation 84 as described previously, including generating the pending P2P DAG entry 86i (specifying three (3) hops to reach the destination RPL network device "P" 16), and suppressing any transmission of an updated confined DIO advertisement message 32.

The RPL network device "G" 16 responds to the confined DIO advertisement message 32c by determining in operation 76 that it is an "identified device" in the hop-by-hop path 22, and in response executing the objective function "OF_P" in operation 78, and determining that the advertising device "H" is at least two hops closer to the destination RPL network device "P" 16 than the parent specified in the hop-by-hop path 22 (e.g., as specified in the list 58 of identified network devices); hence, the RPL network device "G" 16 can respond to execution of the objective function "OF_P" by creating the P2P DAG entry 90g (illustrated in FIG. 1F) specifying it is three (3) hops from the destination RPL network device "P" 16 based on forming the locally-optimized connection 80 via the advertising RPL network device "H" 16. Although not shown in the Figures, the RPL network device "G" 16 also can selectively generate and output an updated confined DIO advertisement message 32 specifying the RPL network device "G" 16 is three (3) hops from the destination RPL network device "P" 16.

The RPL network device "K" 16 responds to the confined DIO advertisement message 32c by determining it is not an identified device in operation 76, and that the confined DIO advertisement message 32c is not its first confined DIO advertisement message 32 as indicated by the pending P2P DAG entry 86k. The RPL network device "K" in operation 92 can determine that the next confined DIO advertisement message 32c has a worse (i.e., higher) hop count of two (2) hop counts for reaching the RPL network device 16 compared to its local pending P2P DAG entry 86k specifying one (1) hop count for reaching the destination RPL network device "P" 16. Hence, the RPL network device "K" 16 in operation 96 determines its pending P2P DAG entry 86k provides a better path for reaching the destination RPL network device "P" 16 than the most recent confined DIO advertisement message 32c, and in response the RPL network device "K" 16 in operation 96 changes its entry from an (inactive) pending entry to an "active" P2P DAG entry 90k and changes the pending connection 88 to a locally-optimized connection 80 via destination RPL network device "P" 16. As described previously, the P2P DAG entry 90k also specifies the termination requirement for termination of the locally-optimized tree 30.

As illustrated in FIG. 1F, the RPL network device "K" in operation 96 can respond to generating its P2P DAG entry 90k by generating and outputting an updated confined DIO advertisement message 32d specifying the destination RPL network device "P" 16 is reachable in one (1) hop.

The RPL network device "G" in operations 76 and 78 can determine from the objective function "OF_P" that the confined DIO advertisement message 32d advertises a shorter (1-hop) path to the destination RPL network device "P" 16 than specified in the P2P DAG entry 90g; hence, the RPL network device "G" in operation 78 can update its P2P DAG entry 90g to specify a locally-optimized connection 80 via the RPL network device "K" using two (2) hops (as illustrated in FIG. 1G), and via the network device "H" via three (3) hops (alternately the RPL network device "G" can prune the locally-optimized connection 80 via the network device "H").

The RPL network device "J" 16 can respond to receiving the confined DIO advertisement message 32d in operation 76 by determining that it is an "identified device" in the hop-by-hop path 22, and in response execute in operation 78 the objective function "OF_P" as described previously, resulting in the RPL network device "J" 16 generating the P2P DAG entry 90j specifying two hops for reaching the destination RPL network device "P" 16 via the RPL network device "K", and generating and outputting the updated confined DIO advertisement message 32e illustrated in FIG. 1H.

The source RPL network device "N" 16 in operation 76 can respond to receiving the confined DIO advertisement message 32e in operation 76 by determining that it is the "identified ingress leaf device" in the hop-by-hop path 22, and in response execute in operation 78 the objective function "OF_P" as described previously, resulting in the source RPL network device "N" 16 generating the P2P DAG entry 90n specifying three (3) hops for reaching the destination RPL network device "P" 16 via the RPL network device "J". The source RPL network device "N" 16 also can detect that it is the "identified ingress leaf device" in the hop-by-hop path 22, and in response suppress transmission of any confined DIO advertisement message 32, resulting in the locally-optimized tree 30a of FIG. 1I.

Hence, the example embodiments enable the destination RPL network device "P" 16 to initiate localized optimization of the locally-optimized tree 30a, where the source RPL network device "N" 16 can reach the destination RPL network device "P" 16 within three (3) hops as opposed to the original 6-hop hop-by-hop path 22 illustrated in FIG. 1A.

Further optimizations to the locally-optimized tree 30 can be obtained based on the topology in the tree-based DODAG topology 12: as illustrated in FIG. 1J, if the confined DIO advertisement message 32e transmitted by the RPL network device "J" 16 is detected by the RPL network device "O", the RPL network device "O" can determine from operations 76, 82, and 92 that the confined DIO advertisement message 32e specifies a worse hop count (2 hops) than the 1-hop count specified in the pending P2P DAG entry 86o; hence, as described previously, the RPL network device "O" in operation 96 can determine that its pending P2P DAG entry 86o specifies a better path for reaching the destination RPL network device "P" 16 than specified in the confined DIO advertisement message 32e, and in response can change the pending P2P DAG entry 86o to an "active" P2P DAG entry 90o and output a corresponding updated confined DIO advertisement message 32 specifying the destination RPL network device "P" 16 is reachable in one (1) hop via the RPL network device "O" 16.

Hence, the source RPL network device "N" 16 can respond to reception of the confined DIO advertisement message 32f by updating its P2P DAG entry 90 to specify the destination RPL network device "P" 16 is reachable in two (2) hops via the locally-optimized connection 80 with the RPL network device "O" 16, resulting in the further-improved locally-optimized tree 30b of FIG. 1L. As illustrated in FIG. 1L, the non-identified devices "I", "M", and "Q" delete their respective pending P2P DAG entries 86 in response to failing to receive a second confined DIO advertisement message 32 that satisfies the untagged propagation rules 60b within the prescribed time interval "T_EXP". Hence, the example embodiments demonstrate that an improved locally-optimized tree 30b can be locally established by a destination RPL network device "P" 16 within a complex tree-based DODAG topology 12 having no neighboring common parent; as such the example embodiments provide improved P2P optimization compared to prior techniques that relied on route installation in a common parent, and enables P2P optimization in the absence of neighboring parents for the source RPL network device "N" 16 or the destination RPL network device "P" 16.

As illustrated in FIG. 1M, the example embodiments enable the destination RPL network device "P" 16 to initiate generation of the locally-optimized tree 30c that has the same topology as the locally-optimized tree 30b, despite the different topologies in the tree-based DODAG topology 12 underlying the locally-optimized tree 30b (RPL network device "M" is attached to parent device "D") compared to the tree-based DODAG topology 12' underlying the locally-optimized tree 30c (RPL network device "M" is attached to parent device "E"). Hence, FIG. 1M illustrates that the locally-optimized tree 30c provides an optimized two-hop path for reaching the destination RPL network device "P" 16, as opposed to the ten-hop path provided by the tree-based DODAG topology 12' via the root network device 14. As described previously, each of the RPL network devices 16 in the locally-optimized tree 30 can delete the corresponding P2P DAG entry 90, for termination of the locally-optimized tree 30 at the execution of the termination requirement (e.g., the temporal limit having been reached, the requisite amount of data having been transmitted, etc.).

According to example embodiments, P2P optimization can be executed in an existing tree-based DODAG topology based on causing a destination RPL network device to generate a locally-optimized tree using confined advertisements that limit propagation toward the source RPL network device and surrounding neighboring devices. The example embodiments enable the P2P optimization to be executed in a scalable manner by any destination RPL network device in a large-scale RPL network, enabling the scalable generation of optimized P2P routes that can provide guaranteed quality of service, with minimal messaging in the DODAG topology.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a network device, a hop-by-hop path in a low-power and lossy network having a tree-based topology originated at a root network device, the hop-by-hop path comprising identified network devices for forwarding a data packet from a source network device to a destination device in the tree-based topology; and
   causing, by the network device, the destination device to initiate generation of a locally-optimized tree that bypasses the root network device and optimizes forwarding of the data packet from the source network device to the destination device, based on confined advertisements within the tree-based topology relative to the identified network devices.

2. The method of claim 1, wherein the causing includes sending, to the destination device, an instruction causing the destination device to output a first of the confined advertisements that advertises the destination device as a root of the locally-optimized tree.

3. The method of claim 2, wherein the causing further includes:
   second causing any one of the identified network devices to selectively output an updated one of the confined advertisements in response to receiving any one of the confined advertisements; and
   third causing propagation of the confined advertisements to be confined based on causing non-identified network devices, that are in the tree-based topology but not identified in the hop-by-hop path, to selectively suppress transmission of any of the confined advertisements.

4. The method of claim 3, wherein the third causing includes causing each non-identified network device to suppress transmission of any of the confined advertisements until said each non-identified network device receives at least two of the confined advertisements from other network devices in the tree-based topology and specifying different hop counts for reaching the destination device, and a later one of the confined advertisements advertises a worse hop count for reaching the destination device than provided by the non-identified network device.

5. The method of claim 3, wherein the second causing comprises any one of:
   sending, to each identified network device, a corresponding instruction specifying a corresponding hop count of the corresponding identified network device for reaching the destination device along the hop-by-hop path; or
   sending, to the destination device, an instruction identifying the identified network devices and respective hop counts for reaching the destination device along the hop-by-hop path.

6. The method of claim 2, wherein the instruction further causes the destination device to specify, within the first of the confined advertisements, the identified network devices and respective hop counts for reaching the destination device along the hop-by-hop path.

7. The method of claim 1, wherein the causing includes causing each non-identified network device to suppress transmission of any of the confined advertisements until said each non-identified network device receives at least two of the confined advertisements from other network devices in the tree-based topology and specifying different hop counts for reaching the destination device, and a later one of the confined advertisements advertises a worse hop count for reaching the destination device than provided by the non-identified network device.

8. The method of claim 1, wherein the causing includes sending, to the destination device, an instruction causing the destination device to advertise itself as a root of the locally-optimized tree for a specified flow identifier associated with the data packet from the source network device to the destination device.

9. The method of claim 1, wherein:
the network device is one of the root network device, one of the identified network devices operating as a common parent for the source network device and the destination device in the tree-based topology, or a distinct network device outside the tree-based topology; and
the instruction further specifies a termination requirement that causes the destination device to terminate the locally-optimized tree in response to detecting execution of the termination requirement.

10. An apparatus implemented as a physical machine, the apparatus comprising:
non-transitory machine readable media configured for storing executable machine readable code;
a device interface circuit; and
a processor circuit configured for executing the machine readable code, and when executing the machine readable code operable for:
determining a hop-by-hop path in a low-power and lossy network having a tree-based topology originated at a root network device, the hop-by-hop path comprising identified network devices for forwarding a data packet from a source network device to a destination device in the tree-based topology, and
causing, via the device interface circuit, the destination device to initiate generation of a locally-optimized tree that bypasses the root network device and optimizes forwarding of the data packet from the source network device to the destination device, based on confined advertisements within the tree-based topology relative to the identified network devices.

11. The apparatus of claim 10, wherein the processor circuit is configured for generating and sending, to the destination device via the device interface circuit, an instruction causing the destination device to output a first of the confined advertisements that advertises the destination device as a root of the locally-optimized tree.

12. The apparatus of claim 11, wherein the processor circuit further is configured for:
causing any one of the identified network devices to selectively output an updated one of the confined advertisements in response to receiving any one of the confined advertisements; and
causing propagation of the confined advertisements to be confined based on causing non-identified network devices, that are in the tree-based topology but not identified in the hop-by-hop path, to selectively suppress transmission of any of the confined advertisements.

13. The apparatus of claim 12, wherein the processor circuit is configured for causing each non-identified network device to suppress transmission of any of the confined advertisements until said each non-identified network device receives at least two of the confined advertisements from other network devices in the tree-based topology and specifying different hop counts for reaching the destination device, and a later one of the confined advertisements advertises a worse hop count for reaching the destination device than provided by the non-identified network device.

14. The apparatus of claim 12, wherein the processor circuit is configured for causing propagation of the confined advertisements to be confined based on any one of:
generating and sending, to each identified network device, a corresponding instruction specifying a corresponding hop count of the corresponding identified network device for reaching the destination device along the hop-by-hop path; or
generating and sending, to the destination device, an instruction identifying the identified network devices and respective hop counts for reaching the destination device along the hop-by-hop path.

15. The apparatus of claim 11, wherein the instruction further causes the destination device to specify, within the first of the confined advertisements, the identified network devices and respective hop counts for reaching the destination device along the hop-by-hop path.

16. The apparatus of claim 10, wherein the processor circuit is configured for causing each non-identified network device to suppress transmission of any of the confined advertisements until said each non-identified network device receives at least two of the confined advertisements from other network devices in the tree-based topology and specifying different hop counts for reaching the destination device, and a later one of the confined advertisements advertises a worse hop count for reaching the destination device than provided by the non-identified network device.

17. The apparatus of claim 10, wherein:
the apparatus is one of the root network device, one of the identified network devices operating as a common parent for the source network device and the destination device in the tree-based topology, or a distinct network device outside the tree-based topology;
the processor circuit is configured for generating and sending, to the destination device, an instruction causing the destination device to advertise itself as a root of the locally-optimized tree for a specified flow identifier associated with the data packet from the source network device to the destination device.

18. One or more non-transitory tangible media encoded with logic for execution by a machine and when executed by the machine operable for:
determining, by the machine implemented as a network device, a hop-by-hop path in a low-power and lossy network having a tree-based topology originated at a root network device, the hop-by-hop path comprising identified network devices for forwarding a data packet from a source network device to a destination device in the tree-based topology; and
causing, by the network device, the destination device to initiate generation of a locally-optimized tree that bypasses the root network device and optimizes forwarding of the data packet from the source network device to the destination device, based on confined advertisements within the tree-based topology relative to the identified network devices.

19. The one or more non-transitory tangible media of claim 18, wherein the causing includes causing each non-identified network device to suppress transmission of any of the confined advertisements until said each non-identified network device receives at least two of the confined advertisements from other network devices in the tree-based topology and specifying different hop counts for reaching the destination device, and a later one of the confined advertisements advertises a worse hop count for reaching the destination device than provided by the non-identified network device.

20. The one or more non-transitory tangible media of claim 18, wherein the causing includes sending, to the destination device, an instruction causing the destination device to advertise itself as a root of the locally-optimized tree for a specified flow identifier associated with the data packet from the source network device to the destination device.

\* \* \* \* \*